US011220153B2

(12) United States Patent
Omori

(10) Patent No.: US 11,220,153 B2
(45) Date of Patent: Jan. 11, 2022

(54) AIR CONDITIONER FOR VEHICLE

(71) Applicant: DENSO CORPORATION, Kariya (JP)

(72) Inventor: Shun Omori, Kariya (JP)

(73) Assignee: DENSO CORPORATION, Kariya (JP)

(*) Notice: Subject to any disclaimer, the term of this patent is extended or adjusted under 35 U.S.C. 154(b) by 222 days.

(21) Appl. No.: 16/542,728

(22) Filed: Aug. 16, 2019

(65) Prior Publication Data

US 2019/0366796 A1 Dec. 5, 2019

Related U.S. Application Data

(63) Continuation of application No. PCT/JP2018/003352, filed on Feb. 1, 2018.

(30) Foreign Application Priority Data

Mar. 14, 2017 (JP) .............................. JP2017-048945
Jan. 11, 2018 (JP) .............................. JP2018-002662

(51) Int. Cl.
*B60H 1/00* (2006.01)

(52) U.S. Cl.
CPC ..... *B60H 1/00064* (2013.01); *B60H 1/00028* (2013.01); *B60H 1/00564* (2013.01); *B60H 1/00849* (2013.01); *B60H 2001/0015* (2013.01); *B60H 2001/00114* (2013.01); *B60H 2001/00185* (2013.01)

(58) Field of Classification Search
CPC .. B60H 2001/00114; B60H 2001/0015; B60H 1/00028; B60H 1/00064; B60H 2001/00185; B60H 1/00021; B60H 1/00564; B60H 1/00557

USPC ......................... 454/69–165; 165/42; 62/244
See application file for complete search history.

(56) References Cited

U.S. PATENT DOCUMENTS

| 3,998,385 A | * | 12/1976 | Ogle | .................. B60H 1/00507 237/12.3 B |
| 4,467,706 A | * | 8/1984 | Batcheller | ............ B01D 50/002 165/244 |
| 2005/0011640 A1 | * | 1/2005 | Tohda | ................ B60H 1/00207 165/202 |

(Continued)

FOREIGN PATENT DOCUMENTS

| DE | 102010055439 A1 | 6/2012 |
| JP | 2008126800 A | 6/2008 |

*Primary Examiner* — Vivek K Shirsat
*Assistant Examiner* — Ko-Wei Lin
(74) *Attorney, Agent, or Firm* — Harness, Dickey & Pierce, P.L.C.

(57) ABSTRACT

An air conditioner is disposed in a vehicle in which a driving device of a traveling power source is housed in an outer space separated from a cabin by a partition wall. The air conditioner includes: a temperature control unit that controls a temperature of air blown into the cabin; and plural air distribution ducts connected to the temperature control unit to guide temperature-controlled air having a temperature controlled by the temperature control unit to predetermined positions in the cabin. The temperature control unit is disposed in the outer space together with the driving device. Intermediate parts of the air distribution ducts located at least between the outer space and the cabin are bundled together and extended through a single insertion hole formed in the partition wall.

13 Claims, 16 Drawing Sheets

(56) References Cited

U.S. PATENT DOCUMENTS

| | | | |
|---|---|---|---|
| 2008/0110184 A1* | 5/2008 | Hirooka | B60H 1/242 |
| | | | 62/97 |
| 2014/0069604 A1 | 3/2014 | Tamakoshi | |
| 2014/0213166 A1* | 7/2014 | Goenka | B60H 1/242 |
| | | | 454/139 |
| 2015/0151606 A1* | 6/2015 | Harke | B60H 1/00021 |
| | | | 55/434.2 |
| 2016/0288623 A1* | 10/2016 | Dal Vecchio | B60H 1/242 |
| 2017/0080781 A1* | 3/2017 | Kwak | B60H 1/3421 |
| 2017/0203631 A1* | 7/2017 | Ryu | B60H 1/00028 |
| 2017/0326940 A1* | 11/2017 | Shin | B60H 1/00064 |
| 2018/0134120 A1* | 5/2018 | Marginean | B60H 1/242 |
| 2018/0201087 A1* | 7/2018 | Soto | B60H 1/00028 |

* cited by examiner

AIR CONDITIONER FOR VEHICLE

CROSS REFERENCE TO RELATED APPLICATION

The present application is a continuation application of International Patent Application No. PCT/JP2018/003352 filed on Feb. 1, 2018, which designated the U.S. and claims the benefit of priority from Japanese Patent Application No. 2017-48945 filed on Mar. 14, 2017 and Japanese Patent Application No. 2018-2662 filed on Jan. 11, 2018. The entire disclosures of all of the above applications are incorporated herein by reference.

TECHNICAL FIELD

The present disclosure relates to an air conditioner for a vehicle.

BACKGROUND ART

There has been conventionally proposed an air conditioner, in which a temperature control unit controls the temperature of air blown into a cabin and an air distribution unit distributes air having a temperature controlled by the temperature control unit into the cabin.

SUMMARY

According to an aspect of the present disclosure, an air conditioner is disposed in a vehicle in which a driving device of a traveling power source is housed in an outer space separated from a cabin by a partition wall. The air conditioner includes: a temperature control unit that controls a temperature of air blown into the cabin; and plural air distribution ducts connected to the temperature control unit to guide temperature-controlled air having a temperature controlled by the temperature control unit to predetermined positions in the cabin. The temperature control unit is disposed in the outer space together with the driving device. Intermediate parts of the air distribution ducts located at least between the outer space and the cabin are bundled together and extended through a single insertion hole formed in the partition wall.

DESCRIPTION OF EMBODIMENTS

Figure 1:
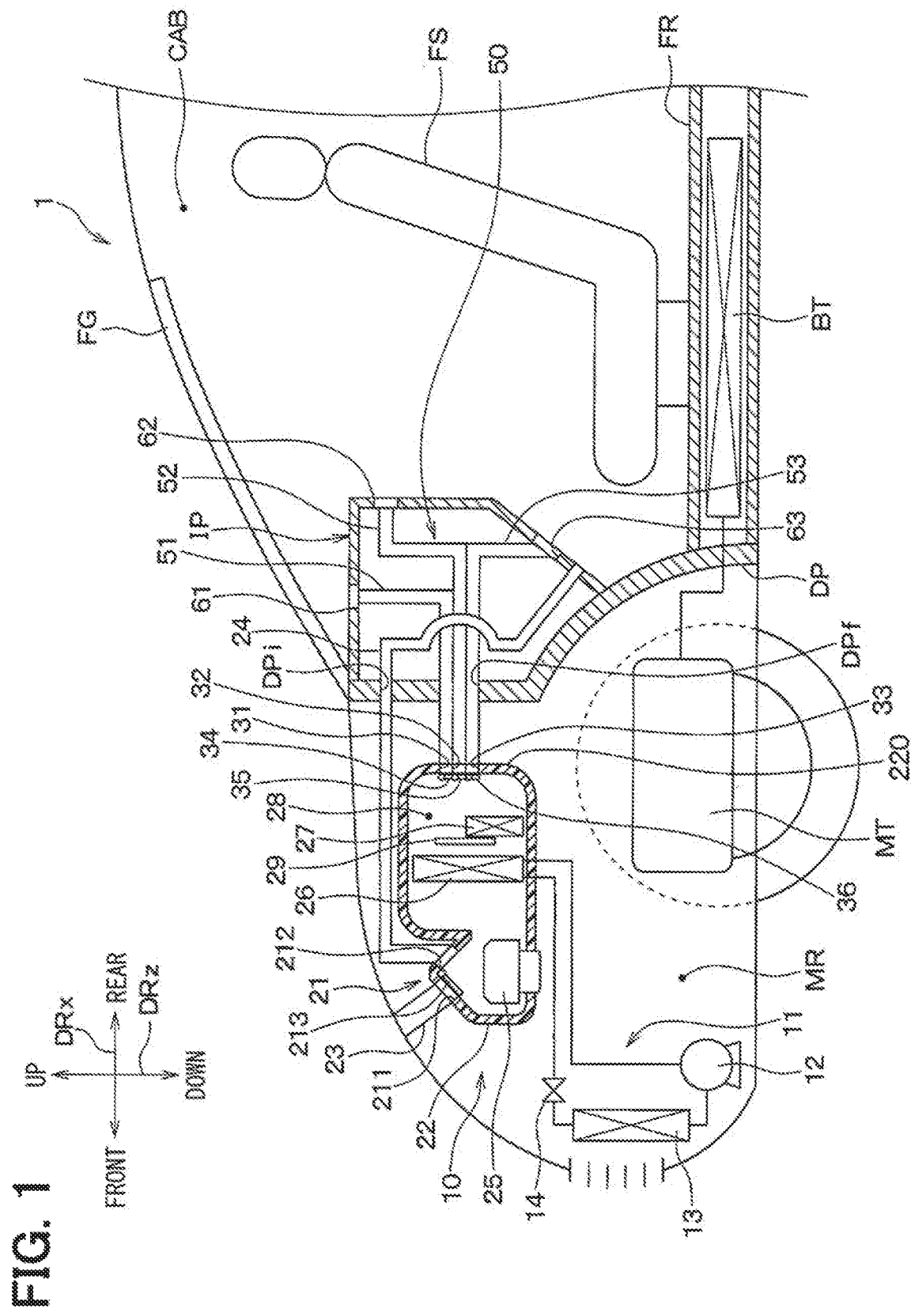
FIG. 1 is a schematic side view of a vehicle equipped with an air conditioner of a first embodiment.

To begin with, examples of relevant techniques will be described. An air conditioner includes a temperature control unit that controls the temperature of air blown into a cabin and an air distribution unit that distributes air having a temperature controlled by the temperature control unit into the cabin. Various constituent devices of the temperature control unit are aggregated in the engine room. In this case, there is an advantage that the maintainability is improved.

A sufficient space inside a cabin can be secured by disposing a temperature control unit in an outer space which constitutes an engine room. The present inventors have conducted earnest studies in order to achieve practical utilization of an air conditioner in which a temperature control unit is disposed in an outer space. As a result, the inventors have found out the following new issues to be solved.

Specifically, in the air conditioner, blowoff parts each of which blows air into the cabin are disposed at different positions, and an air distribution unit includes plural air distribution ducts so as to guide air to each of the blowoff parts. The air distribution ducts are independent of each other to allow air having different temperatures to flow.

Thus, when the temperature control unit is disposed in the outer space, it is necessary to newly form plural insertion holes for inserting the respective air distribution ducts in a partition wall which separates the outer space and the inside of the cabin (that is, a dash panel).

The insertion holes newly formed on the partition wall have adverse effects that noise generated in the outer space is prone to reach the cabin and the operation for inserting the air distribution ducts through the insertion holes on the partition wall during manufacture becomes complicated.

When the temperature control unit is disposed in the outer space in this manner, although a sufficient space inside the cabin can be secured, there are various tradeoffs, such as deterioration of the sound insulation property inside the cabin and deterioration of the workability during manufacture.

The present disclosure provides an air conditioner for a vehicle that makes it possible to secure a sufficient space inside a cabin while preventing the occurrence of various tradeoffs.

According to an aspect of the present disclosure, an air conditioner is disposed in a vehicle in which a driving device of a traveling power source is housed in an outer space separated from a cabin by a partition wall.

The air conditioner includes: a temperature control unit that controls a temperature of air blown into the cabin; and plural air distribution ducts connected to the temperature control unit to guide temperature-controlled air having a temperature controlled by the temperature control unit to predetermined positions in the cabin.

The temperature control unit is disposed in the outer space together with the driving device. Intermediate parts of the air distribution ducts located at least between the outer space and the cabin are bundled together and extended through a single insertion hole formed in the partition wall.

In the configuration in which the temperature control unit is disposed in the outer space in which the driving device is housed in the vehicle in this manner, it is possible to secure a sufficient space inside the cabin as compared to a configuration in which the temperature control unit is disposed in the cabin.

Further, the air conditioner has the air distribution ducts that guide air having a temperature controlled by the temperature control unit into the cabin. Thus, it is possible to blow air having different temperatures to different positions in the cabin.

In particular, in the air conditioner, the intermediate parts of the air distribution ducts located at least between the outer space and the cabin are bundled together and inserted through the single insertion hole formed in the partition wall. Accordingly, noise generated in the outer space is less likely to leak into the cabin. Thus, it is possible to ensure the sound insulation property in the cabin. Further, during manufacture, it is only required that the air distribution ducts in a bundled state be inserted through the insertion hole of the partition wall. Thus, it is possible to improve the workability during manufacture.

Thus, the air conditioner of the present disclosure makes it possible to secure a sufficient space inside the cabin while preventing the occurrence of various tradeoffs.

According to another aspect of the present disclosure, the air distribution ducts include plural hot air introduction ducts that mainly guide hot air generated by the temperature control unit into the cabin and a cold air introduction duct that mainly guides cold air generated by the temperature control unit into the cabin. The intermediate part of the cold air introduction duct extended through the insertion hole is interposed between the intermediate parts of the hot air introduction ducts extended through the insertion hole.

Accordingly, the exposed area of the cold air introduction duct directly exposed to the outer space is reduced. In other words, the intermediate parts of the hot air introduction ducts are capable of functioning as a heat insulating element that thermally protects the intermediate part of the cold air introduction duct. Thus, it is possible to prevent a temperature rise in cold air flowing through the cold air introduction duct, the temperature rise being caused by heat generated by the driving device in the outer space.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

The present embodiment will be described with reference to FIGS. 1 to 4. An arrow DRx in FIGS. 1 and 2 indicates a front-rear direction of a vehicle. An arrow DRy in FIG. 2 indicates a right-left direction of the vehicle 1 (that is, the width direction of the vehicle). An arrow DRz in FIG. 1 indicates an up-down direction of the vehicle 1. The same applies to the drawings other than FIGS. 1 and 2.

In the present embodiment, an air conditioner 10 of the present disclosure is applied to the vehicle (so-called electric vehicle) 1 in which a driving device which constitutes a traveling power source is an electric motor MT. The electric motor MT is driven by power supplied from a battery BT housed in a floor part FR of the vehicle 1.

As illustrated in FIG. 1, in the vehicle 1 of the present embodiment, the electric motor MT as the driving device is housed in a device housing room MR which is separated from a cabin CAB by a dash panel DP. In this type of vehicle 1, the driving device is simpler than that in a vehicle driven by an engine. Thus, there is an enough space in the device housing room MR. In the present embodiment, the device housing room MR constitutes the outer space, and the dash panel DP constitutes the partition wall that separates the cabin CAB and the device housing room MR as the outer space.

The air conditioner 10 has a temperature control unit 20 which controls the temperature of air blown into the cabin CAB and an air distribution unit 50 which guides the air having a temperature controlled by the temperature control unit 20 to a predetermined position in the cabin CAB.

As described above, the vehicle 1 of the present embodiment has an enough space in the device housing room MR. Thus, in the air conditioner 10, the temperature control unit 20 is disposed in the device housing room MR, and the air distribution unit 50 is disposed over the device housing room MR and the cabin CAB.

The temperature control unit 20 is disposed at a position close to the dash panel DP in the device housing room MR. The temperature control unit 20 includes an air conditioning case 22 which constitutes an outer shell, and a blower 25, an evaporator 26, a heating device 27, and the like which are housed inside the air conditioning case 22.

An air passage through which air can circulate is formed inside the air conditioning case 22. The air conditioning case 22 is made of resin having a certain degree of elasticity and high strength (e.g., polypropylene). An inside and outside air switching box 21 is disposed on the upstream side of air flow in the air conditioning case 22. The inside and outside air switching box 21 introduces air inside the cabin (that is, inside air) and air outside the cabin (that is, outside air) in a switching manner.

The inside and outside air switching box 21 includes an outside air introduction port 211 which introduces outside air into the air conditioning case 22 and an inside air introduction port 212 which introduces inside air into the air conditioning case 22. An outside air introduction duct 23 which introduces outside air into the temperature control unit 20 is connected to the outside air introduction port 211. An inside air introduction duct 24 which introduces inside air into the temperature control unit 20 is connected to the inside air introduction port 212.

The inside air introduction duct 24 is disposed over the device housing room MR and the cabin CAB. One end of the inside air introduction duct 24 inserted through an inside air insertion hole Dpi which is formed in the dash panel DP is connected to the inside air introduction port 212, and the other end thereof is disposed inside an instrument panel IP on the front side of the cabin CAB. Although not illustrated, the dash panel DP is provided with a seal member disposed between the inside air insertion hole Dpi and the inside air introduction duct 24. The seal member prevents leakage of noise in the device housing room MR through a gap between the inside air insertion hole Dpi and the inside air introduction duct 24.

The whole of the outside air introduction duct 23 of the present embodiment is disposed in the device housing room MR. That is, the outside air introduction duct 23 of the present embodiment is not disposed over the device housing room MR and the cabin CAB. In the present embodiment, of the outside air introduction duct 23 and the inside air introduction duct 24, the inside air introduction duct 24 constitutes a cabin side suction duct.

An inside and outside air switching door 213 is disposed on the inside and outside air switching box 21. The inside and outside air switching door 213 opens and closes the outside air introduction port 211 and the inside air introduction port 212. The inside and outside air switching door 213 is capable of adjusting an open ratio between the outside air introduction port 211 and the inside air introduction port 212.

The blower 25 is disposed on the downstream side of air flow of the inside and outside air switching box 21. The blower 25 includes an electric blower that drives a centrifugal fan by an electric motor. The blower 25 is not limited to the electric blower including the centrifugal fan and may be an electric blower provided with an axial flow fan.

The evaporator 26 is disposed on the downstream side of the blower 25 in air flow. The evaporator 26 is a cooling device that exchanges heat between a refrigerant flowing inside the evaporator 26 and air from the blower 25 to cool the air.

Specifically, the evaporator 26 constitutes a vapor compression refrigeration cycle 11 together with a compressor 12, a condenser 13, an expansion valve 14, and the like. The refrigeration cycle 11 is housed in the device housing room MR in a manner similar to the temperature control unit 20. The compressor 12 of the refrigeration cycle 11 compresses and discharges a refrigerant. The condenser 13 exchanges heat between the refrigerant discharged from the compressor 12 and outside air to dissipate heat from the refrigerant. The expansion valve 14 depressurizes and expands the refrigerant flowing out of the condenser 13.

The heating device 27 is disposed on the downstream side of the evaporator 26 in the air flow. The heating device 27 heats air passing through the evaporator 26. The heating device 27 includes an electric heater or a heating heat exchanger that uses waste heat of the vehicle 1 (e.g., waste heat of the refrigeration cycle 11).

A bypass passage 28 is formed on the downstream side of the evaporator 26 in the air flow. The bypass passage 28 allows air to bypass the heating device 27 and flow. An air mix door 29 is disposed between the evaporator 26 and the heating device 27. The air mix door 29 adjusts an air volume ratio between air flowing to the heating device 27 and air flowing to the bypass passage 28.

A defroster opening 31, a face opening 32, and a foot opening 33 are formed on the most downstream side of the air conditioning case 22 in the air flow as outlets of temperature-controlled air controlled to a desired temperature by the evaporator 26 and the heating device 27.

The defroster opening 31, the face opening 32, and the foot opening 33 are formed on a facing wall 220 of the air conditioning case 22 facing the dash panel DP. The defroster opening 31, the face opening 32, and the foot opening 33 are formed in this order in the up-down direction DRz in the air conditioning case 22 of the present embodiment. The defroster opening 31, the face opening 32, and the foot opening 33 communicate with predetermined positions in the cabin CAB through the air distribution unit 50.

A defroster door 34, a face door 35, and a foot door 36 are disposed on the upstream side of the openings 31 to 33 in the air flow, respectively, inside the air conditioning case 22. The defroster door 34, the face door 35, and the foot door 36 open and close the openings 31 to 33, respectively.

Next, the air distribution unit 50 will be described. The air distribution unit 50 is provided with plural air distribution ducts 51 to 53 which guide temperature-controlled air having a temperature controlled by the temperature control unit 20 to predetermined positions in the cabin CAB. Specifically, the air distribution unit 50 of the present embodiment includes a defroster duct 51, a face duct 52, and a foot duct 53.

The defroster duct 51 is an air distribution duct that guides temperature-controlled air to a defroster blowoff part 61 which blows the temperature-controlled air toward a window (specifically, a windshield FG) in the cabin CAB. The defroster duct 51 of the present embodiment constitutes a hot air introduction duct that mainly guides hot air generated by the temperature control unit 20 to the inner face of the windshield FG in the cabin CAB.

The defroster blowoff part 61 is a blowoff part for mainly spraying hot air to the windshield FG to heat the windshield FG to prevent windshield fogging. The defroster blowoff part 61 is disposed on the upper face side of the instrument panel IP which faces a front seat FS, the upper face side being close to the windshield FG.

The face duct 52 is an air distribution duct that guides temperature-controlled air to a face blowoff part 62 which blows the temperature-controlled air toward the upper body of an occupant in the cabin CAB. The face duct 52 of the present embodiment constitutes a cold air introduction duct that mainly guides cold air generated by the temperature control unit 20 toward the upper body of the occupant in the cabin CAB.

The face blowoff part 62 is a blowoff part for mainly spraying cold air to the upper body of the occupant to cool the upper body of the occupant to bring the cabin CAB into a temperature distribution for keeping the head cool and the feet warm. The face blowoff part 62 is disposed on a part of the instrument panel IP, the part facing the upper body of the occupant. The face blowoff part 62 is disposed on a part of the instrument panel IP, the part being located on the upper side relative to a foot blowoff part 63 and on the lower side relative to the defroster blowoff part 61.

Figure 2:
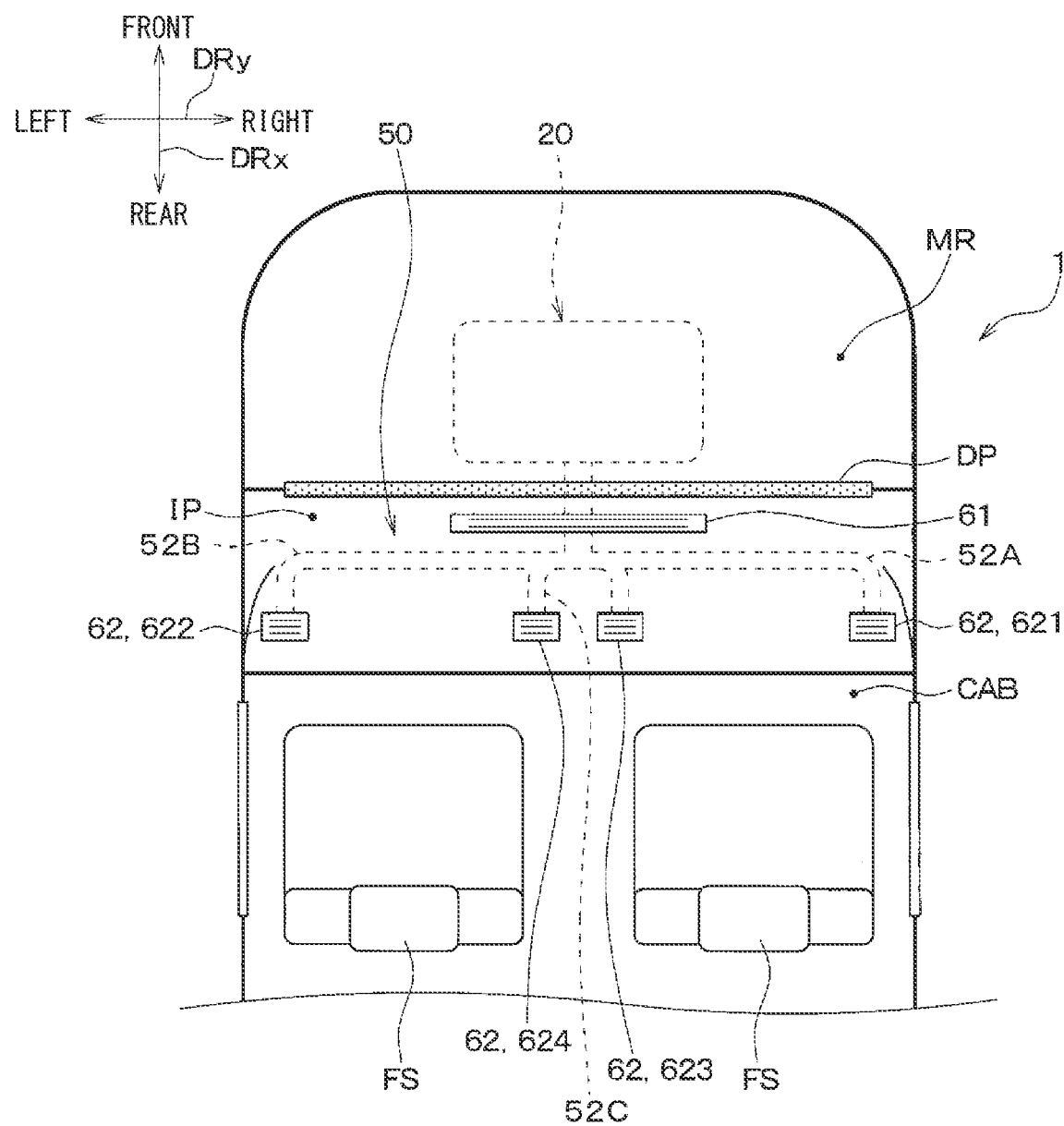
FIG. 2 is a schematic top view of the vehicle equipped with the air conditioner of the first embodiment.

As illustrated in FIG. 2, the face blowoff part 62 includes a pair of side blowoff parts 621, 622 and a pair of center blowoff parts 623, 624. The pair of side blowoff parts 621, 622 blows temperature-controlled air from both sides in the right-left direction DRy in the cabin CAB. The pair of center blowoff parts 623, 624 is disposed between the side blowoff parts 621, 622 in the cabin CAB.

The face duct 52 of the present embodiment includes a pair of side ducts 52A, 52B which guides temperature-controlled air to the pair of side blowoff parts 621, 622 and a center duct 52C which guides temperature-controlled air to the pair of center blowoff parts 623, 624.

The face duct 52 of the present embodiment is not divided in the device housing room MR and divided into the pair of side ducts 52A, 52B and the center duct 52C in the cabin CAB. That is, the face duct 52 is configured as an air distribution duct including a single air passage in a part located in the device housing room MR.

Referring back to FIG. 1, the foot duct 53 is an air distribution duct that guides temperature-controlled air to the foot blowoff part 63 which blows the temperature-controlled air toward the lower body of the occupant in the cabin CAB. The foot duct 53 of the present embodiment constitutes a hot air introduction duct that mainly guides hot air generated by the temperature control unit 20 toward the lower body of the occupant in the cabin CAB.

The foot blowoff part 63 is a blowoff part for mainly spraying hot air to the lower body of the occupant to heat the lower body of the occupant to bring the cabin CAB into a temperature distribution for keeping the head cool and the feet warm. The foot blowoff part 63 is disposed on a part of the instrument panel IP, the part facing the lower body of the occupant. The foot blowoff part 63 is disposed on a part of the instrument panel IP, the part being located on the lower side relative to the defroster blowoff part 61 and the face blowoff part 62.

Figure 3:
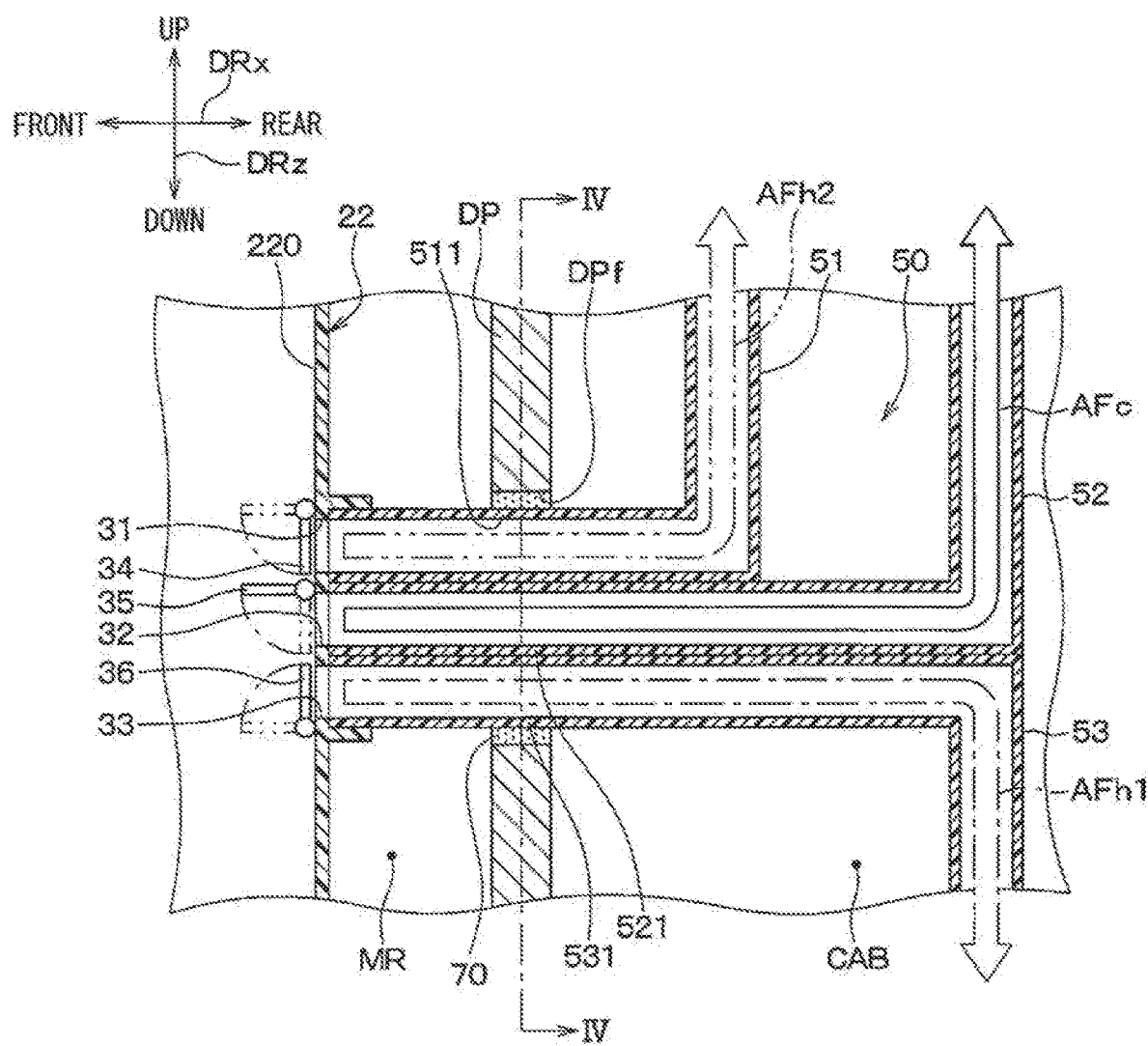
FIG. 3 is a schematic sectional view illustrating the structure of an air distribution unit of the air conditioner of the first embodiment.
Figure 4:
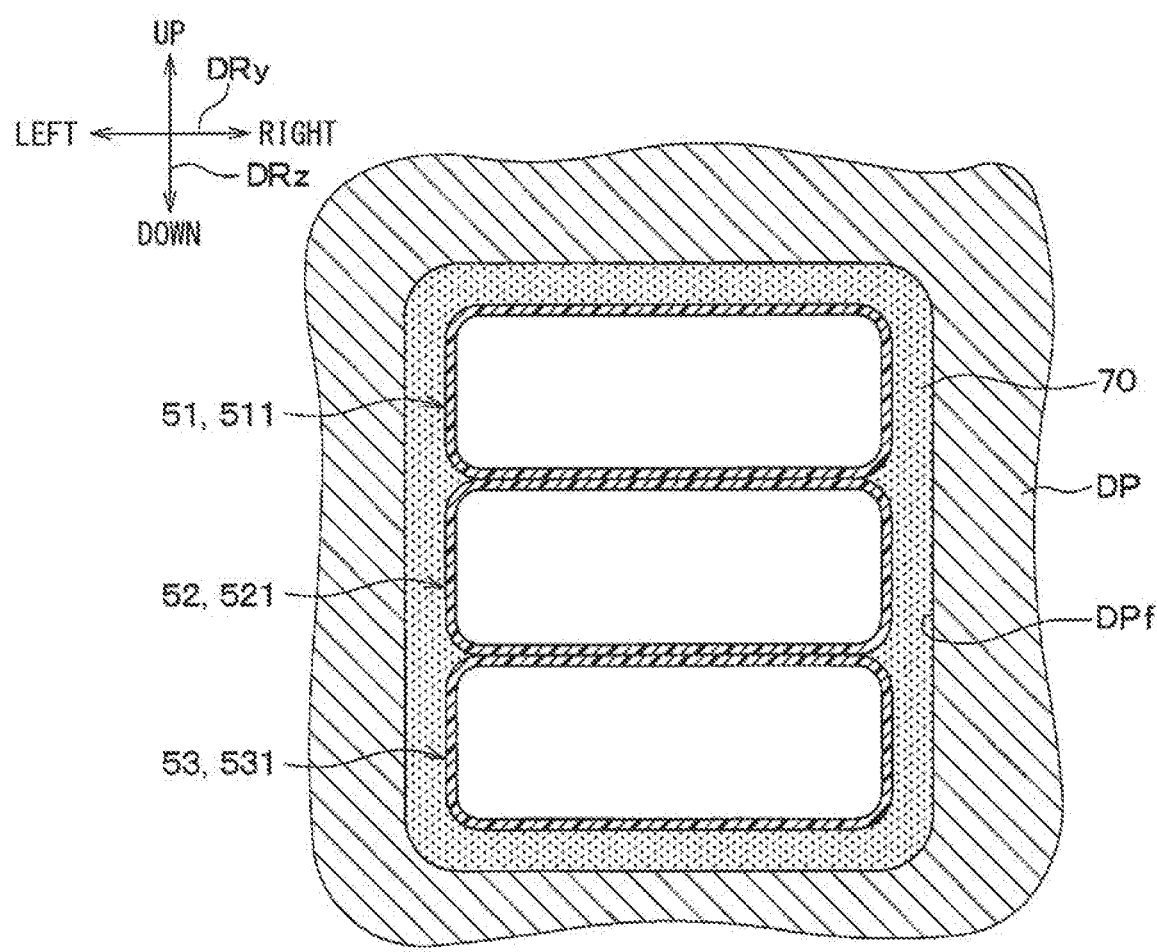
FIG. 4 is a sectional view taken along line IV-IV of FIG. 3.

As illustrated in FIGS. 3 and 4, the defroster duct 51, the face duct 52, and the foot duct 53 of the air distribution unit 50 are inserted through a single air distribution insertion hole DPf which is formed in the dash panel DP, taking into consideration the sound insulation property in the cabin and the workability during manufacture.

The defroster duct 51, the face duct 52, and the foot duct 53 of the present embodiment include intermediate parts 511, 521, 531 which are located between the device housing room MR and the cabin CAB, respectively. The intermediate parts 511, 521, 531 are bundled together and inserted through the single air distribution insertion hole DPf. For convenience of description, hereinbelow, the intermediate part of the face duct 52, the intermediate part being inserted through the air distribution insertion hole DPf, may be referred to as the face intermediate part 521. The intermediate part of the defroster duct 51, the intermediate part being inserted through the air distribution insertion hole DPf, may be referred to as the defroster intermediate part 511. The intermediate part of the foot duct 53, the intermediate part being inserted through the air distribution insertion hole DPf, may be referred to as the foot intermediate part 531.

The defroster intermediate part 511, the face intermediate part 521, and the foot intermediate part 531 of the present embodiment are configured as separate members and integrally bundled together with a binding member such as a clip (not illustrated). The defroster intermediate part 511, the face intermediate part 521, and the foot intermediate part 531 may be configured as an integrally molded product.

The dash panel DP includes a seal member 70 having an annular shape. The seal member 70 is disposed on an opening edge of the air distribution insertion hole DPf. The seal member 70 includes urethane foam or rubber having a sound insulation property. The seal member 70 reduces leakage of noise in the device housing room MR through the air distribution insertion hole DPf.

As described above, the air distribution unit 50 of the present embodiment extends over the device housing room MR and the cabin CAB. In the air distribution unit 50 configured in this manner, there is an apprehension that the temperature of cold air flowing through the face duct 52, which constitutes the cold air introduction duct, rises by heat generated by the electric motor MT in the device housing room MR or heat of outside air flowing into the device housing room MR. The temperature rise in cold air flowing through the face duct 52 becomes a factor in deteriorating the comfort in the cabin CAB and increasing an energy loss of the air conditioner 10, and is thus not preferred.

Thus, as illustrated in FIGS. 3 and 4, the air distribution unit 50 of the present embodiment has a disposition configuration in which the face intermediate part 521 is interposed between the defroster intermediate part 511 and the foot intermediate part 531.

In the air distribution unit 50 of the present embodiment, the intermediate parts 511, 521, 531 are stacked in the up-down direction DRz corresponding to the positions of the blowoff parts 61 to 63 in the up-down direction DRz. That is, the air distribution unit 50 of the present embodiment has a disposition configuration in which the face intermediate part 521 is interposed between the defroster intermediate part 511 and the foot intermediate part 531 in the up-down direction DRz. The defroster intermediate part 511 is disposed on the upper side of the foot intermediate part 531 in the up-down direction DRz. In other words, in the present embodiment, the defroster intermediate part 511 is adjacent to the upper side of the face intermediate part 521 in the up-down direction DRz, and the foot intermediate part 531 is adjacent to the lower side of the face intermediate part 521 in the up-down direction DRz.

Since the face intermediate part 521 is interposed between the defroster intermediate part 511 and the foot intermediate part 531 in the up-down direction DRz, an area exposed to the outside in the face intermediate part 521 is reduced. In order to avoid a temperature rise in cold air flowing through the face duct 52 in the device housing room MR, the part of the face duct 52, the part being located in the device housing room MR, is also preferably interposed between the defroster duct 51 and the foot duct 53.

Next, the operation of the air conditioner 10 of the present embodiment will be described. The air conditioner 10 blows cold air generated by the temperature control unit 20 toward the upper body of the occupant in the cabin CAB through the face duct 52 and the face blowoff part 62 during cooling in the cabin CAB. Since cold air is blown toward the upper body of the occupant during cooling in the cabin CAB in this manner, the cabin CAB is brought into a comfortable temperature distribution for keeping the head cool and the feet warm.

Specifically, during cooling in the cabin CAB, cold air flows inside the face duct 52 as indicated by a solid line arrow AFc of FIG. 3. At this time, the defroster opening 31 and the foot opening 33 are closed by the defroster door 34 and the foot door 36, respectively. Thus, no air flows to the defroster duct 51 and the foot duct 53. Thus, during cooling in the cabin CAB, internal spaces of the defroster duct 51 and the foot duct 53 function as an air layer that prevents heat transfer between the inside of the face duct 52 and the device housing room MR (that is, a heat insulating layer). That is, the defroster duct 51 and the foot duct 53 function as a heat insulating element that insulates the face duct 52 from heat. Accordingly, a temperature rise in cold air flowing through the face duct 52, the temperature rise being caused by heat generated by the electric motor MT in the device housing room MR, is prevented.

During cooling in the cabin CAB, a large volume of cold air may be blown out of the face blowoff part 62 in order to obtain a prompt effect of air conditioning. In this case, noise may be generated by vibrations of the face duct 52.

In the air distribution unit 50 of the present embodiment, the defroster duct 51 and the foot duct 53 function as a damper element that absorbs vibrations of the face duct 52. Thus, the generation of noise caused by vibrations of the face duct 52 is prevented.

The air conditioner 10 blows hot air generated by the temperature control unit 20 toward the lower body of the occupant in the cabin CAB through the foot duct 53 and the foot blowoff part 63 during heating in the cabin CAB. Since hot air is blown toward the lower body of the occupant during heating in the cabin CAB in this manner, the cabin CAB is brought into a comfortable temperature distribution for keeping the head cool and the feet warm.

Specifically, during heating in the cabin CAB, hot air flows inside the foot duct 53 as indicated by a dot-and-dash line arrow AFh1 of FIG. 3. At this time, the face opening 32 is closed by the face door 35. Thus, no air flows to the face duct 52. Thus, during heating in the cabin CAB, an internal space of the face duct 52 functions as an air layer that prevents heat transfer between the inside of the foot duct 53 and the device housing room MR (that is, a heat insulating layer). That is, the face duct 52 functions as a heat insulating element that insulates the foot duct 53 from heat. Accordingly, a temperature change in hot air flowing through the foot duct 53, the temperature change being caused by heat in the machine housing room MR, is prevented.

Further, the air conditioner 10 blows hot air generated by the temperature control unit 20 toward the windshield FG in the cabin CAB through the defroster duct 51 and the defroster blowoff part 61 during defogging for preventing windshield fogging in the cabin CAB. Since hot air is blown toward the windshield FG during defogging in the cabin CAB in this manner, fogging of the windshield FG is prevented.

Specifically, during defogging in the cabin CAB, hot air flows inside the defroster duct 51 as indicated by a two-dot chain line arrow AFh2 of FIG. 3. At this time, the face opening 32 is closed by the face door 35. Thus, no air flows to the face duct 52. Thus, during defogging in the cabin CAB, an internal space of the face duct 52 functions as an air layer that prevents heat transfer between the inside of the defroster duct 51 and the device housing room MR (that is, a heat insulating layer). That is, the face duct 52 functions as a heat insulating element that insulates the defroster duct 51 from heat. Accordingly, a temperature change in hot air flowing through the defroster duct 51, the temperature change being caused by heat in the device housing room MR, is prevented. The defogging in the cabin CAB may be performed in parallel to heating in the cabin CAB.

In the air conditioner 10 described above, the temperature control unit 20 is disposed in the device housing room MR in the vehicle 1. Accordingly, it is possible to secure a sufficient space in the cabin CAB as compared to a configuration in which the temperature control unit 20 is disposed in the cabin CAB.

The air conditioner 10 is provided with the air distribution ducts 51 to 53 which guide air having a temperature controlled by the temperature control unit 20 into the cabin CAB. Thus, it is possible to blow air having different temperatures to different positions in the cabin CAB.

In particular, in the air conditioner 10, the intermediate parts 511, 521, 531 of the air distribution ducts 51 to 53, the intermediate parts 511, 521, 531 being located between the device housing room MR and the cabin CAB, are bundled together and inserted through the single air distribution insertion hole DPf formed on the dash panel DP. Accordingly, noise generated in the device housing room MR is less likely to leak into the cabin CAB. Thus, it is possible to ensure the sound insulation property in the cabin CAB. Further, during manufacture, it is only required that the air distribution ducts 51 to 53 in a bundled state be inserted through the air distribution insertion hole DPf on the dash panel DP. Thus, it is possible to improve the workability during manufacture. Further, there is also an advantage that the strength of the dash panel DP can be easily ensured.

Thus, the air conditioner 10 of the present embodiment makes it possible to secure a sufficient space in the cabin CAB while preventing occurrence of various problems.

In the present embodiment, the intermediate part 521 of the face duct 52, which constitutes the cold air introduction duct, is interposed between the intermediate part 511 of the defroster duct 51 and the intermediate part 531 of the foot duct 53, the defroster duct 51 and the foot duct 53 constituting the hot air introduction duct.

Accordingly, the exposed area directly exposed to the device housing room MR is reduced in the face duct 52. During cooling in the cabin CAB, the internal spaces of the defroster duct 51 and the foot duct 53 function as the air layer that prevents heat transfer between the inside of the face duct 52 and the device housing room MR (that is, the heat insulating layer). In other words, the intermediate part 511 of the defroster duct 51 and the intermediate part 531 of the foot duct 53 are capable of functioning as the heat insulating element that thermally protects the intermediate part 521 of the face duct 52. Thus, it is possible to prevent a temperature rise in cold air flowing through the face duct 52, the temperature rise being caused by heat generated by the electric motor MT in the device housing room MR.

Specifically, in the air conditioner 10 of the present embodiment, the intermediate parts 511, 521, 531 of the air distribution ducts 51 to 53 are bundled together corresponding to the positions of the blowoff parts 61 to 63 in the up-down direction DRz. Accordingly, it is possible to simplify routing of each of the air distribution ducts 51 to 53 on the cabin CAB side. The simplification of the routing of each of the air distribution ducts 51 to 53 has an advantage that a sufficient space in the cabin CAB can be more easily secured.

In the vehicle 1 in which the traveling driving device is the electric motor MT, the device housing room MR has more space than a vehicle in which the driving device is an engine. Thus, the air conditioner 10 in which the temperature control unit 20 is disposed in the device housing room MR is suitable for the vehicle 1 in which the driving device is the electric motor MT.

Modification of First Embodiment

The first embodiment describes an example in which the intermediate parts 511, 521, 531 of the air distribution ducts 51 to 53 are bundled together corresponding to the positions of the blowoff parts 61 to 63 in the up-down direction DRz. However, the present disclosure is not limited thereto.

Figure 5:
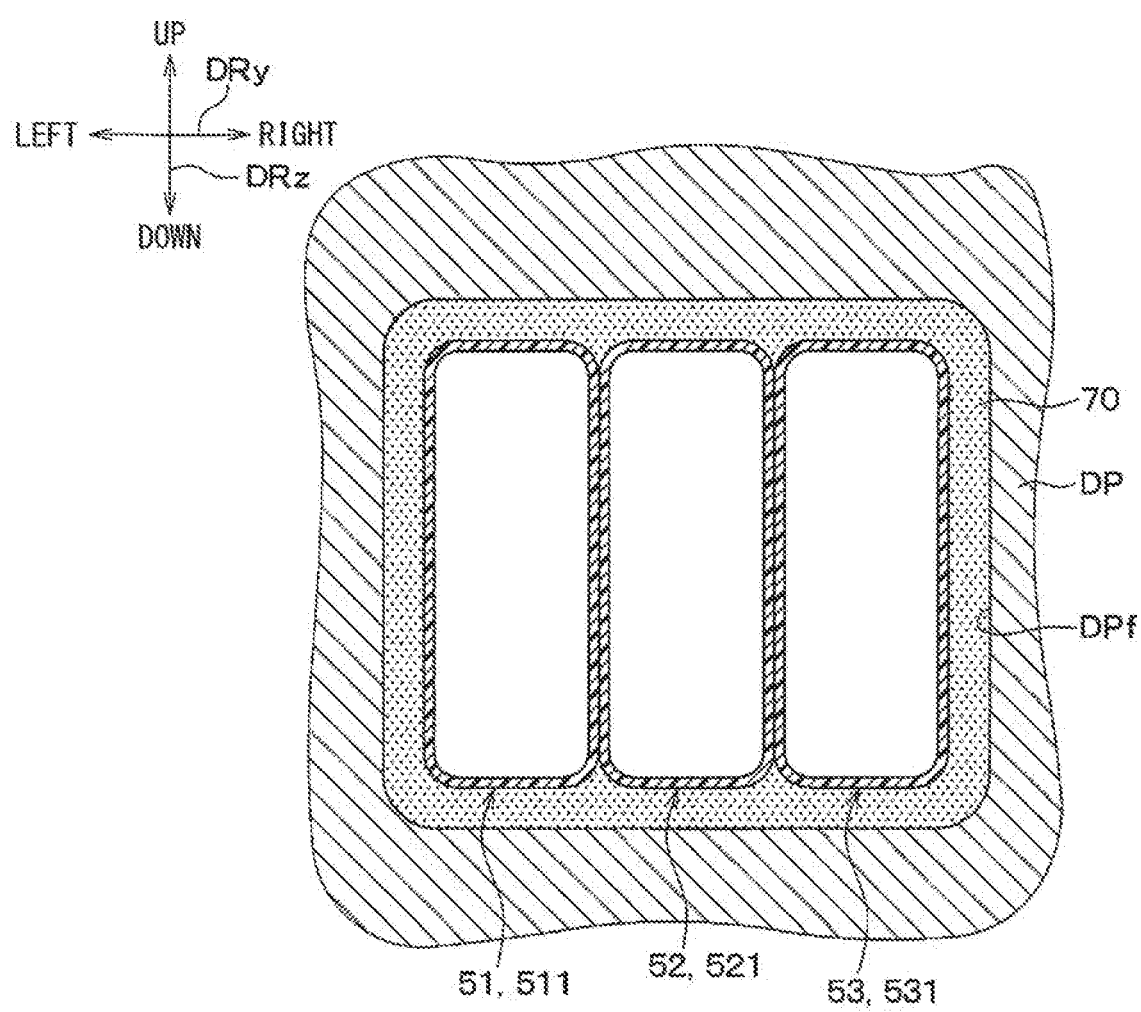
FIG. 5 is a schematic sectional view illustrating an air distribution unit as a modification of the air conditioner of the first embodiment.

The intermediate parts 511, 521, 531 of the air distribution ducts 51 to 53 may be stacked in the right-left direction DRy as illustrated in FIG. 5. That is, the air distribution unit 50 may have a disposition configuration in which the face intermediate part 521 is interposed between the defroster intermediate part 511 and the foot intermediate part 531 in the right-left direction DRy. Such a configuration also reduces the exposed area directly exposed to the device housing room MR in the face duct 52. Thus, it is possible to prevent a temperature rise in cold air flowing through the face duct 52, the temperature rise being caused by heat generated by the electric motor MT in the device housing room MR.

Second Embodiment

Next, a second embodiment will be described with reference to FIGS. 6 and 7. The present embodiment differs from the first embodiment in the duct structure of a face duct 52.

Figure 6:
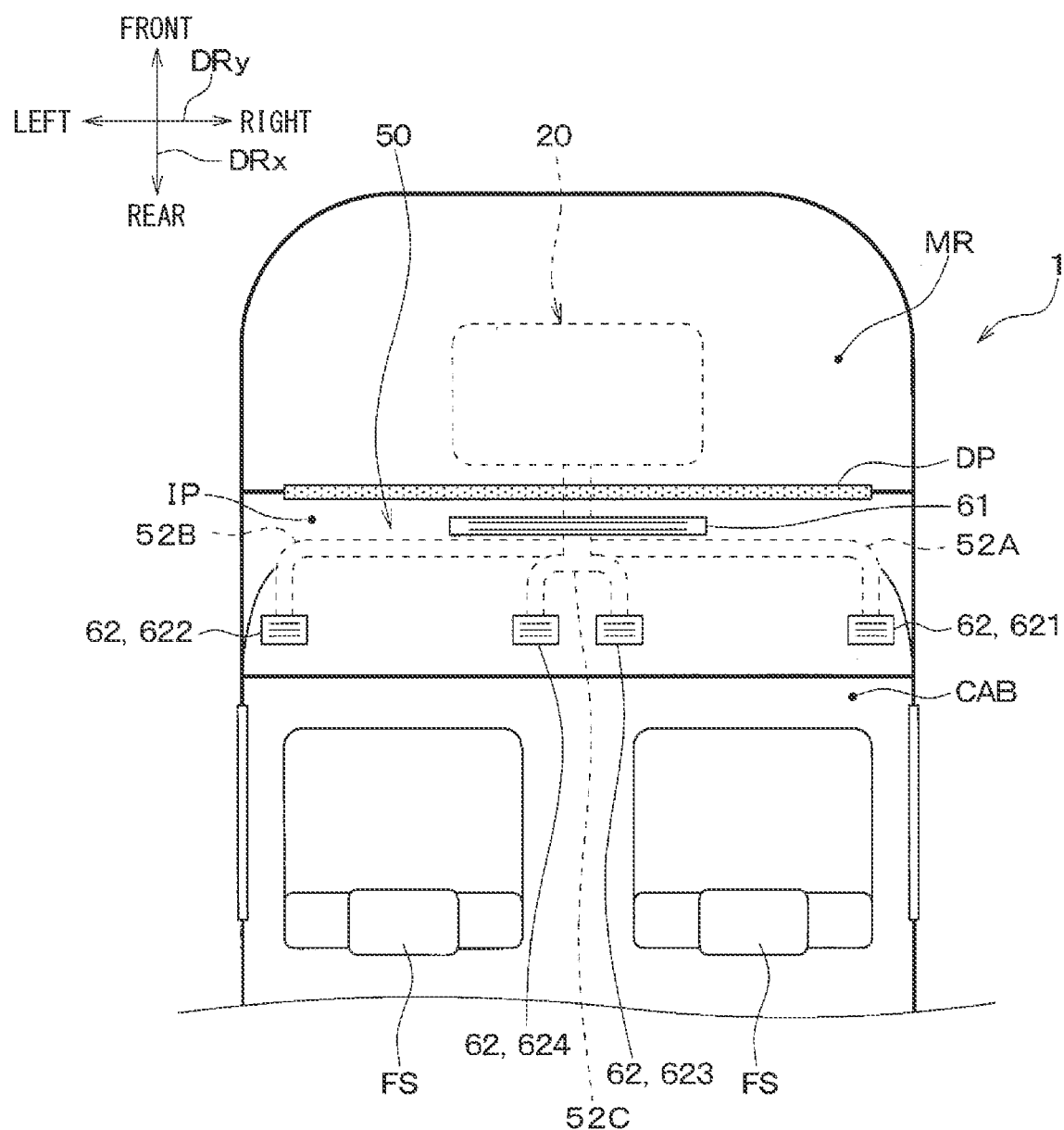
FIG. 6 is a schematic top view of a vehicle equipped with an air conditioner of a second embodiment.

The face duct 52 of the present embodiment illustrated in FIG. 6 is divided not in a cabin CAB, but in a device housing room MR into a pair of side ducts 52A, 52B and a center duct 52C. That is, a part of the face duct 52, the part being located in the device housing room MR, is configured as an air distribution duct including plural air passages.

In such a configuration, when the temperature of cold air flowing through the center duct 52C rises by heat generated by an electric motor MT in the device housing room MR, the comfort in the cabin CAB is likely to deteriorate as compared to the case where the temperature of cold air flowing through the air of side ducts 52A, 52B rises.

Figure 7:
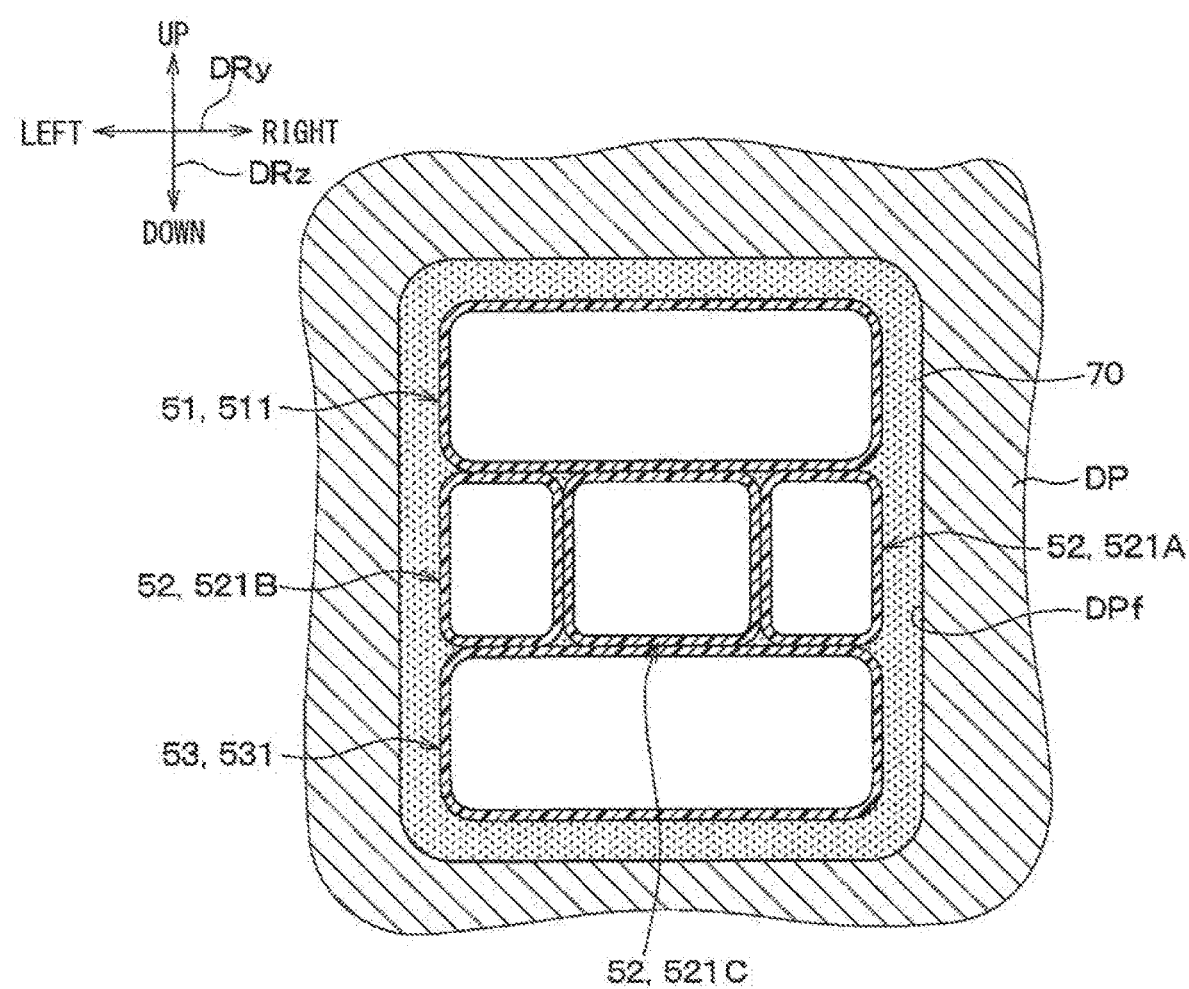
FIG. 7 is a schematic sectional view illustrating an air distribution unit of the air conditioner of the second embodiment.

Thus, as illustrated in FIG. 7, the face duct 52 of the present embodiment has a disposition configuration in which an intermediate part 521C of the center duct 52C is interposed between intermediate parts 521A, 521B of the pair of side ducts 52A, 52B in the right-left direction DRy. That is, the intermediate parts 521A, 521B, 521C of the pair of side ducts 52A, 52B and the center duct 52C are bundled together corresponding to the position of a face blowoff part 62 in the right-left direction DRy.

Further, the outer peripheral side of the intermediate part 521C of the center duct 52C is covered with the intermediate parts 521A, 521B of the pair of side ducts 52A, 52B, a defroster intermediate part 511, and a foot intermediate part 531 so as not to be exposed to the outside.

Specifically, the intermediate part 521C of the center duct 52C is covered with the defroster intermediate part 511 and the foot intermediate part 531 in the up-down direction DRz and covered with the intermediate parts 521A, 521B of the pair of side ducts 52A, 52B in the right-left direction DRy.

The other configuration of the air conditioner 10 of the present embodiment is similar to that of the first embodiment. The air conditioner 10 of the present embodiment can obtain effects achieved by the configuration common with the first embodiment in a manner similar to the first embodiment.

The air conditioner 10 of the present embodiment has a disposition configuration in which the intermediate part 521C of the center duct 52C is interposed between the intermediate parts 521A, 521B of the pair of side ducts 52A, 52B in the right-left direction DRy.

Such a configuration reduces an exposed area directly exposed to the device housing room MR in the center duct 52C. Thus, it is possible to prevent a temperature rise in cold air flowing through the face duct 52, the temperature rise being caused by heat generated by the electric motor MT in the device housing room MR. As a result, it is possible to blow cold air controlled to a comfortable temperature toward the upper body of the occupant.

Further, the outer peripheral side of the intermediate part 521C of the center duct 52C is covered with the intermediate parts 521A, 521B of the pair of side ducts 52A, 52B, a defroster intermediate part 511, and a foot intermediate part 531 so as not to be exposed to the outside.

Accordingly, the intermediate part 521C of the center duct 52C is not directly exposed to the device housing room MR. Thus, it is possible to adequately prevent a temperature rise in cold air flowing through the center duct 52C, the temperature rise being caused by heat generated by the electric motor MT in the device housing room MR.

Third Embodiment

Next, a third embodiment will be described with reference to FIGS. 8 and 9. The present embodiment differs from the first embodiment in the duct structure of an inside air introduction duct 24.

Figure 8:
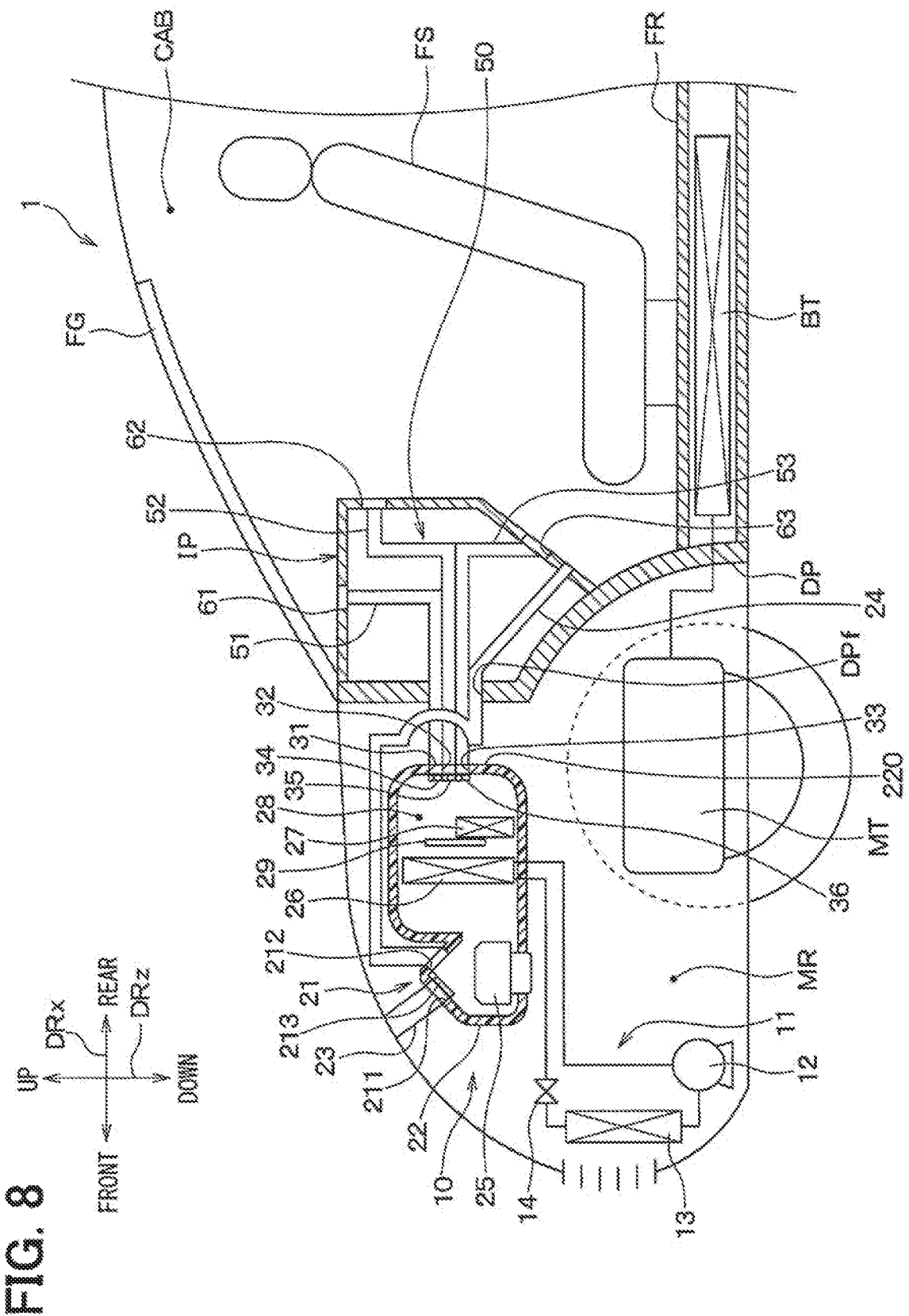
FIG. 8 is a schematic side view of a vehicle equipped with an air conditioner of a third embodiment.
Figure 9:
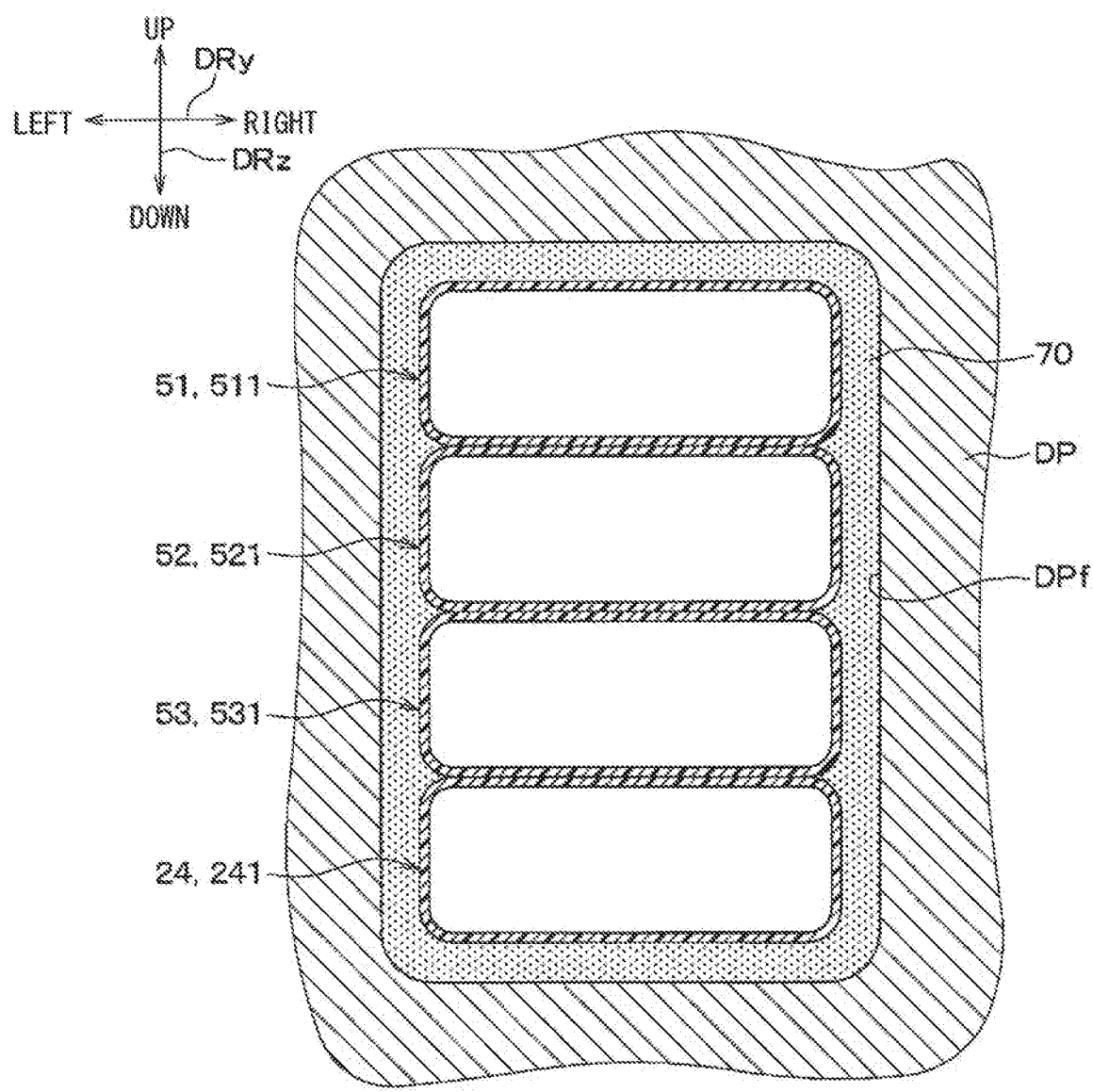
FIG. 9 is a schematic sectional view illustrating an air distribution unit of the air conditioner of the third embodiment.

As illustrated in FIGS. 8 and 9, the inside air introduction duct 24 of the present embodiment is inserted through a single air distribution insertion hole DPf which is formed in a dash panel DP together with air distribution ducts 51 to 53 of an air distribution unit 50. That is, an intermediate part 241 of the inside air introduction duct 24, the intermediate part 241 being located between a device housing room MR and a cabin CAB, is bundled together with a defroster intermediate part 511, a face intermediate part 521, and a foot intermediate part 531, and inserted through the air distribution insertion hole DPf. For convenience of description, hereinbelow, the intermediate part of the inside air introduction duct 24, the intermediate part being inserted through the air distribution insertion hole DPf, may be referred to as the inside air intermediate part 241.

In the present embodiment, the defroster intermediate part 511, the face intermediate part 521, the foot intermediate part 531, and the inside air intermediate part 241 are configured as separate members and integrally bundled together with a binding member such as a clip (not illustrated). The defroster intermediate part 511, the face intermediate part 521, the foot intermediate part 531, and the inside air intermediate part 241 may be configured as an integrally molded product.

In the air distribution unit 50 of the present embodiment, as illustrated in FIG. 9, the inside air intermediate part 241 is disposed on the lower side of the foot intermediate part 531 in the up-down direction DRz. That is, the air distribution unit 50 of the present embodiment has a disposition configuration in which the foot intermediate part 531 is interposed between the face intermediate part 521 and the inside air intermediate part 241.

The other configuration of an air conditioner 10 of the present embodiment is similar to that of the first embodiment. The air conditioner 10 of the present embodiment can obtain effects achieved by the configuration common with the first embodiment in a manner similar to the first embodiment.

In the air conditioner 10 of the present embodiment, the intermediate part 241 of the inside air introduction duct 24 is bundled together with the defroster intermediate part 511, the face intermediate part 521, and the foot intermediate part 531, and inserted through the air distribution insertion hole DPf.

Accordingly, it is possible to reduce the number of insertion holes for inserting ducts on the dash panel DP. Accordingly, noise generated in the device housing room MR is less likely to leak into the cabin CAB. Thus, it is possible to ensure the sound insulation property in the cabin CAB. Further, during manufacture, it is only required that the air distribution ducts 51 to 53 and the inside air introduction duct 24 in a bundled state be inserted through the air distribution insertion hole DPf on the dash panel DP. Thus, it is possible to improve the workability during manufacture.

Further, in the present embodiment, the exposed area directly exposed to the device housing room MR is reduced in the inside air introduction duct 24. Thus, for example, when cold air in the cabin CAB is sucked into the temperature control unit 20 through the inside air introduction duct 24 during cooling in the cabin CAB, it is possible to prevent a temperature rise in cold air flowing through the inside air introduction duct 24, the temperature rise being caused by heat generated by the electric motor MT in the device housing room MR. As a result, it is possible to reduce a cooling load in the temperature control unit 20 and improve the air conditioning efficiency.

Further, the air distribution unit 50 of the present embodiment has a configuration in which the face intermediate part 521 and the foot intermediate part 531 which are adjacent to each other are interposed between the defroster intermediate part 511 and the inside air intermediate part 241. Such a configuration reduces the exposed area directly exposed to the device housing room MR in the face duct 52 and the foot duct 53. Thus, it is possible to prevent a temperature change in air blown toward the occupant, the temperature change being caused by heat generated by the electric motor MT in the device housing room MR. As a result, it is possible to blow temperature-controlled air controlled to a comfortable temperature toward the occupant.

Modification of Third Embodiment

The above third embodiment describes that the inside air intermediate part 241 is disposed on the lower side of the foot intermediate part 531 in the up-down direction DRz. However, the present disclosure is not limited thereto.

Figure 10:
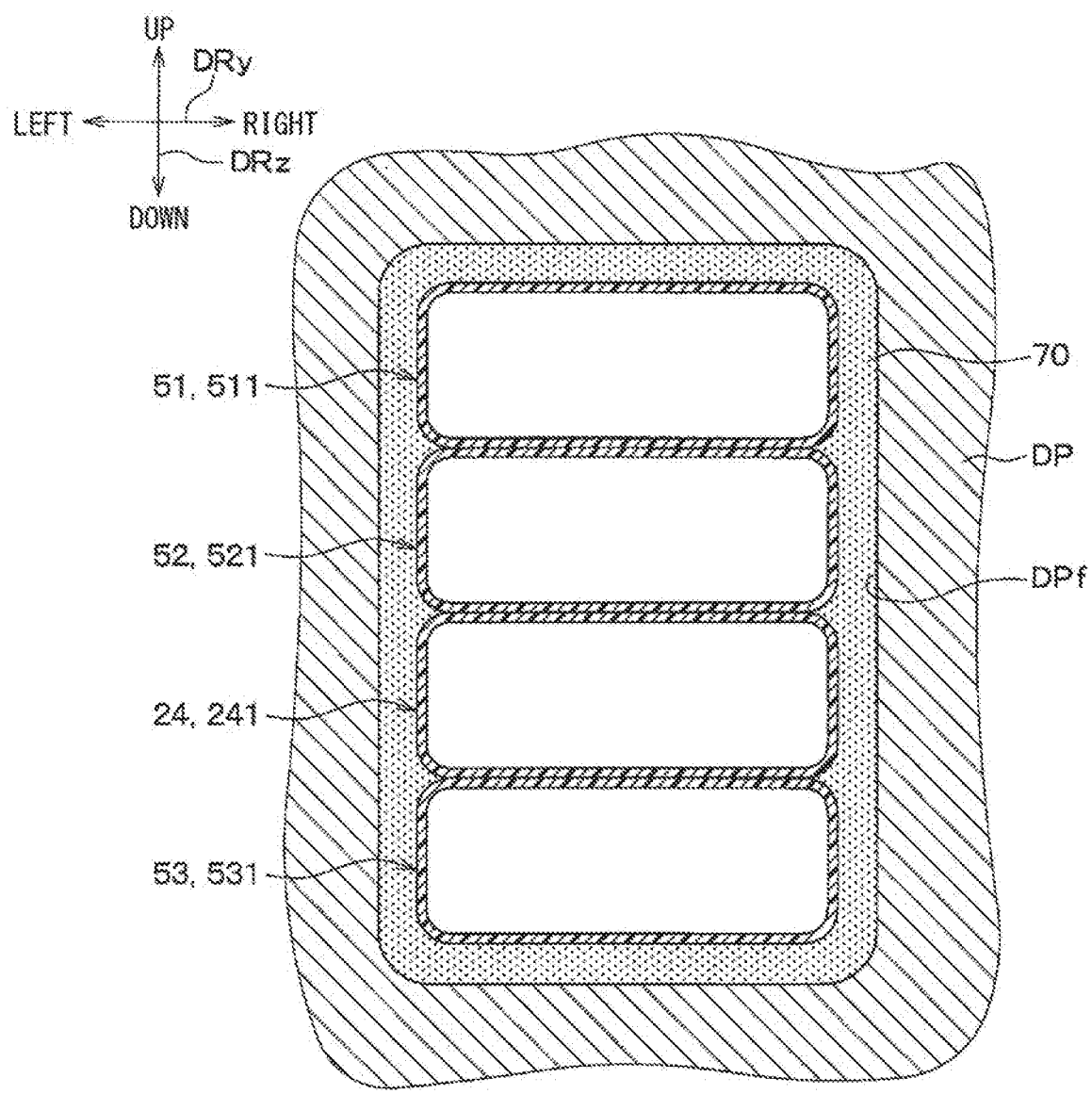
FIG. 10 is a schematic sectional view illustrating an air distribution unit as a modification of the air conditioner of the third embodiment.

As illustrated in FIG. 10, for example, the inside air intermediate part 241 may be interposed between the face intermediate part 521 and the foot intermediate part 531. Such a configuration reduces the exposed area directly exposed to the device housing room MR in the inside air introduction duct 24. Thus, it is possible to prevent a temperature rise in air flowing through the inside air introduction duct 24, the temperature rise being caused by heat generated by the electric motor MT in the device housing room MR.

Figure 11:
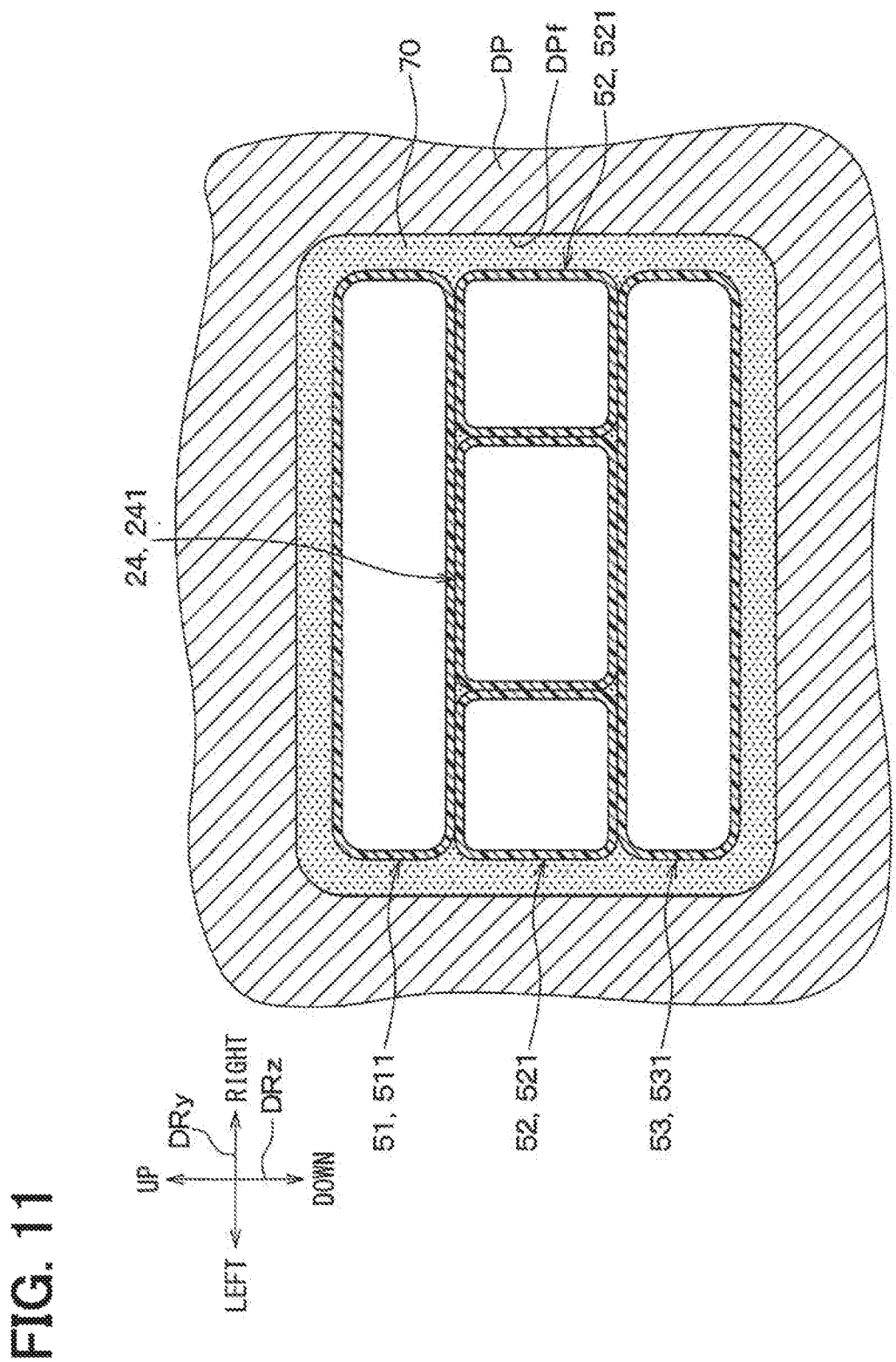
FIG. 11 is a schematic sectional view illustrating an air distribution unit as a modification of the air conditioner of the third embodiment.

Further, as illustrated in FIG. 11, for example, when the face intermediate part 521 branches into two in the right-left direction DRy, the inside air intermediate part 241 may be surrounded by the face intermediate part 521, the foot intermediate part 531, and the defroster intermediate part 511. That is, the inside air intermediate part 241 may be covered with the face intermediate part 521, the foot intermediate part 531, and the defroster intermediate part 511 so that a part exposed to the outside is reduced. The inside air intermediate part 241 may be covered with at least one of the face intermediate part 521, the foot intermediate part 531, and the defroster intermediate part 511.

Such a configuration reduces the exposed area directly exposed to the device housing room MR in the inside air introduction duct 24. Thus, it is possible to adequately prevent a temperature rise in air flowing through the inside air introduction duct 24, the temperature rise being caused by heat generated by the electric motor MT in the device housing room MR. As a result, it is possible to reduce a cooling load in the temperature control unit 20 and improve the air conditioning efficiency.

Fourth Embodiment

Next, a fourth embodiment will be described with reference to FIGS. 12 and 13. The present embodiment differs from the first embodiment in the disposition of intermediate parts 511, 521, 531 of air distribution ducts 51 to 53.

An air distribution unit 50 of the present embodiment extends over a device housing room MR and a cabin CAB in a manner similar to the first embodiment. In the air distribution unit 50 configured in this manner, when the temperature of outside air is low, there is an apprehension that the temperature of hot air flowing through the foot duct 53 which constitutes the hot air introduction duct drops by the outside air flowing into the device housing room MR. The temperature drop in hot air flowing through the foot duct 53 becomes a factor in deteriorating the comfort in the cabin CAB and increasing an energy loss of the air conditioner 10, and is thus not preferred.

Figure 12:
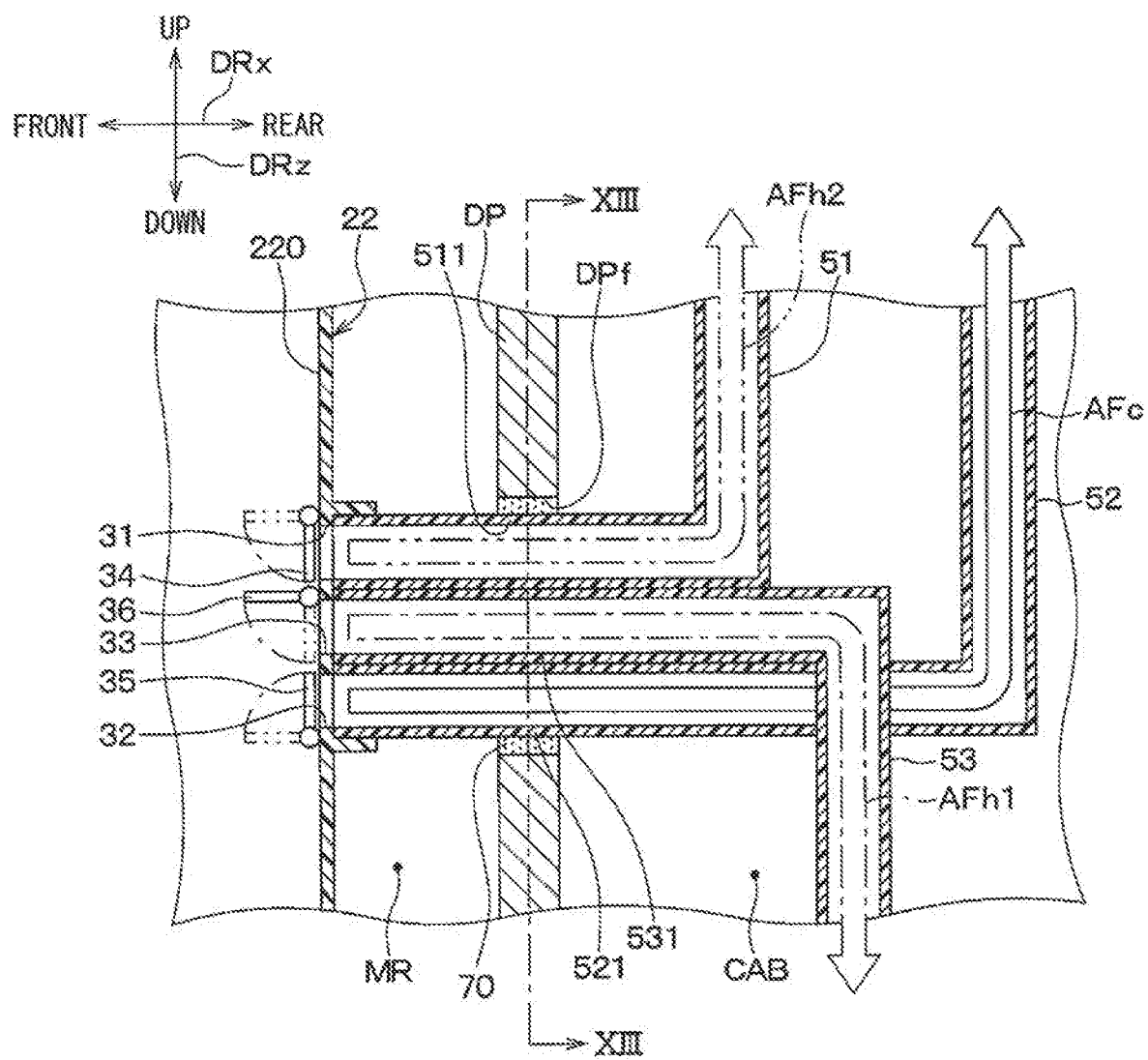
FIG. 12 is a schematic sectional view illustrating an air distribution unit of an air conditioner of a fourth embodiment.
Figure 13:
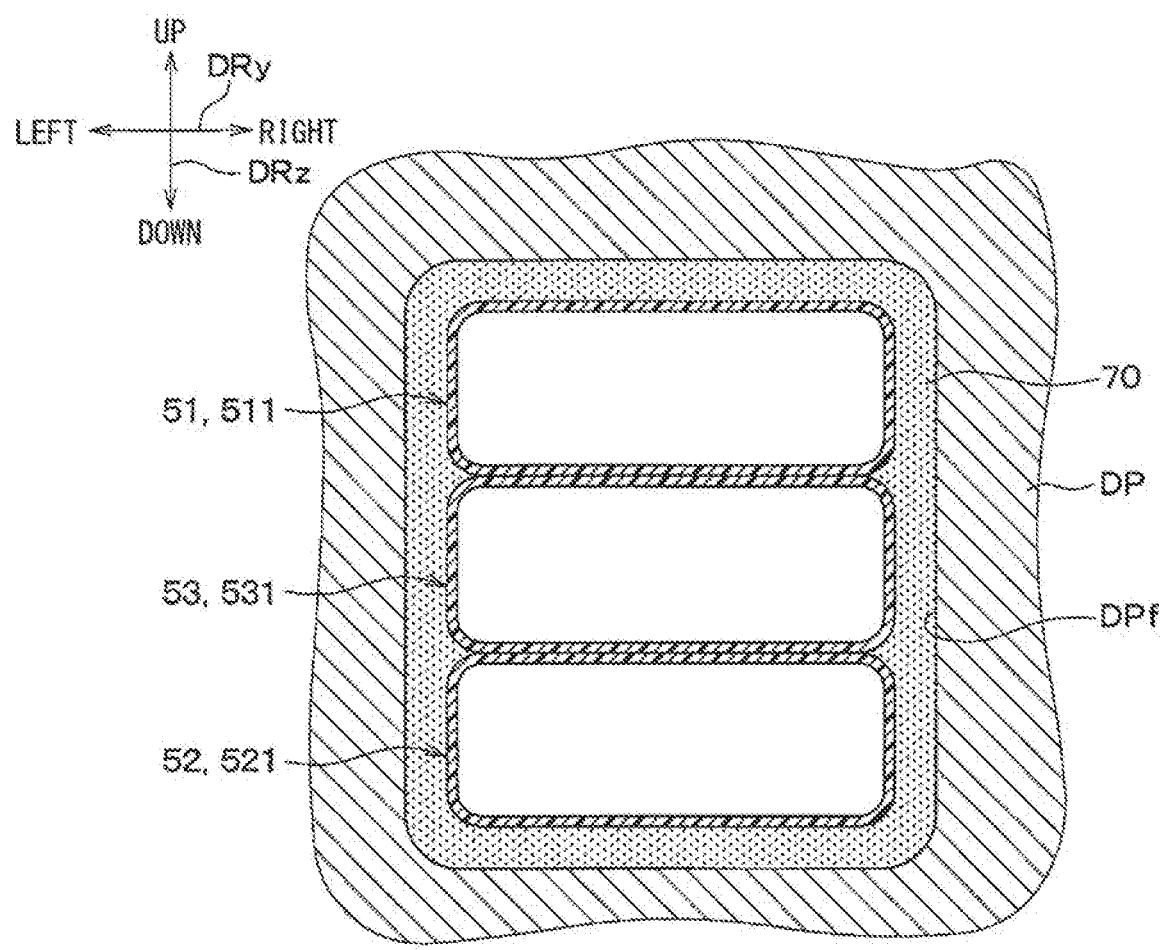
FIG. 13 is a sectional view taken along line XIII-XIII of FIG. 12.

Thus, as illustrated in FIGS. 12 and 13, the air distribution unit 50 of the present embodiment has a disposition configuration in which the foot intermediate part 531 is interposed between the defroster intermediate part 511 and the face intermediate part 521.

Specifically, the air distribution unit 50 of the present embodiment has a disposition configuration in which the foot intermediate part 531 is interposed between the defroster intermediate part 511 and the face intermediate part 521 in the up-down direction DRz. The defroster intermediate part 511 is disposed on the upper side of the face intermediate part 521 in the up-down direction DRz.

Since the foot intermediate part 531 is interposed between the defroster intermediate part 511 and the face intermediate part 521 in the up-down direction DRz, an area exposed to the outside is reduced in the foot intermediate part 531. In order to avoid a temperature drop in hot air flowing through the foot duct 53 in the device housing room MR, a part of the foot duct 53, the part being located in the device housing room MR, is also preferably interposed between the defroster duct 51 and the face duct 52.

Next, the operation of the air conditioner 10 of the present embodiment during heating in the cabin CAB will be described. During heating in the cabin CAB, the air conditioner 10 blows hot air generated by the temperature control unit 20 toward the lower body of an occupant in the cabin CAB through the foot duct 53 and a foot blowoff part 63.

Specifically, during heating in the cabin CAB, hot air flows inside the foot duct 53 as indicated by a dot-and-dash line arrow AFh1 of FIG. 12. At this time, a defroster opening 31 and a face opening 32 are closed by a defroster door 34 and a face door 35, respectively. Thus, no air flows to the defroster duct 51 and the face duct 52. Thus, during heating in the cabin CAB, internal spaces of the defroster duct 51 and the face duct 52 function as an air layer that prevents heat transfer between the inside of the foot duct 53 and the device housing room MR (that is, a heat insulating layer). That is, the defroster duct 51 and the face duct 52 function as a heat insulating element that insulates the foot duct 53 from heat. Accordingly, a temperature drop in hot air flowing through the foot duct 53, the temperature drop being caused by outside air flowing into the machine housing room MR, is prevented.

The other configuration of an air conditioner 10 of the present embodiment is similar to that of the first embodiment. The air conditioner 10 of the present embodiment can obtain effects achieved by the configuration common with the first embodiment in a manner similar to the first embodiment.

In the present embodiment, the intermediate part 531 of the foot duct 53, which constitutes the hot air introduction duct, is interposed between the intermediate part 511 of the defroster duct 51 and the intermediate part 521 of the face duct 52, the defroster duct 51 and the face duct 52 being air distribution ducts other than the foot duct 53.

Accordingly, the exposed area directly exposed to the device housing room MR is reduced in the foot duct 53. Further, during heating in the cabin CAB, the internal spaces of the defroster duct 51 and the face duct 52 function as the air layer that prevents heat transfer between the inside of the foot duct 53 and the device housing room MR (that is, the heat insulating layer). In other words, the intermediate part 511 of the defroster duct 51 and the intermediate part 521 of the face duct 52 are capable of functioning as the heat insulating element that thermally protects the intermediate part 531 of the foot duct 53. Thus, it is possible to prevent a temperature drop in hot air flowing through the foot duct 53, the temperature drop being caused by outside air flowing into the device housing room MR.

Modification of Fourth Embodiment

The above fourth embodiment describes a disposition form in which the intermediate part 531 of the foot duct 53 is interposed between the intermediate part 511 of the defroster duct 51 and the intermediate part 521 of the face duct 52. However, the present disclosure is not limited thereto. For example, when the face duct 52 includes plural ducts, the foot duct 53 may be interposed between intermediate parts 521 of the face ducts 52.

The above fourth embodiment describes an example in which the intermediate parts 511, 521, 531 of the air distribution ducts 51 to 53 are bundled together in the up-down direction DRz. However, the present disclosure is not limited thereto. For example, the intermediate parts 511, 521, 531 of the air distribution ducts 51 to 53 may be stacked in the right-left direction DRy. That is, the air distribution unit 50 may have a disposition configuration in which the foot intermediate part 531 is interposed between the defroster intermediate part 511 and the face intermediate part 521 in the right-left direction DRy. Such a configuration also reduces the exposed area directly exposed to the device housing room MR in the face duct 52. Thus, it is possible to prevent a temperature drop in hot air flowing through the foot duct 53, the temperature drop being caused by outside air flowing into the device housing room MR.

Fifth Embodiment

Next, a fifth embodiment will be described with reference to FIGS. 14 and 15. The present embodiment differs from the first embodiment in the duct structure of an outside air introduction duct 23A and an inside air introduction duct 24.

Figure 14:
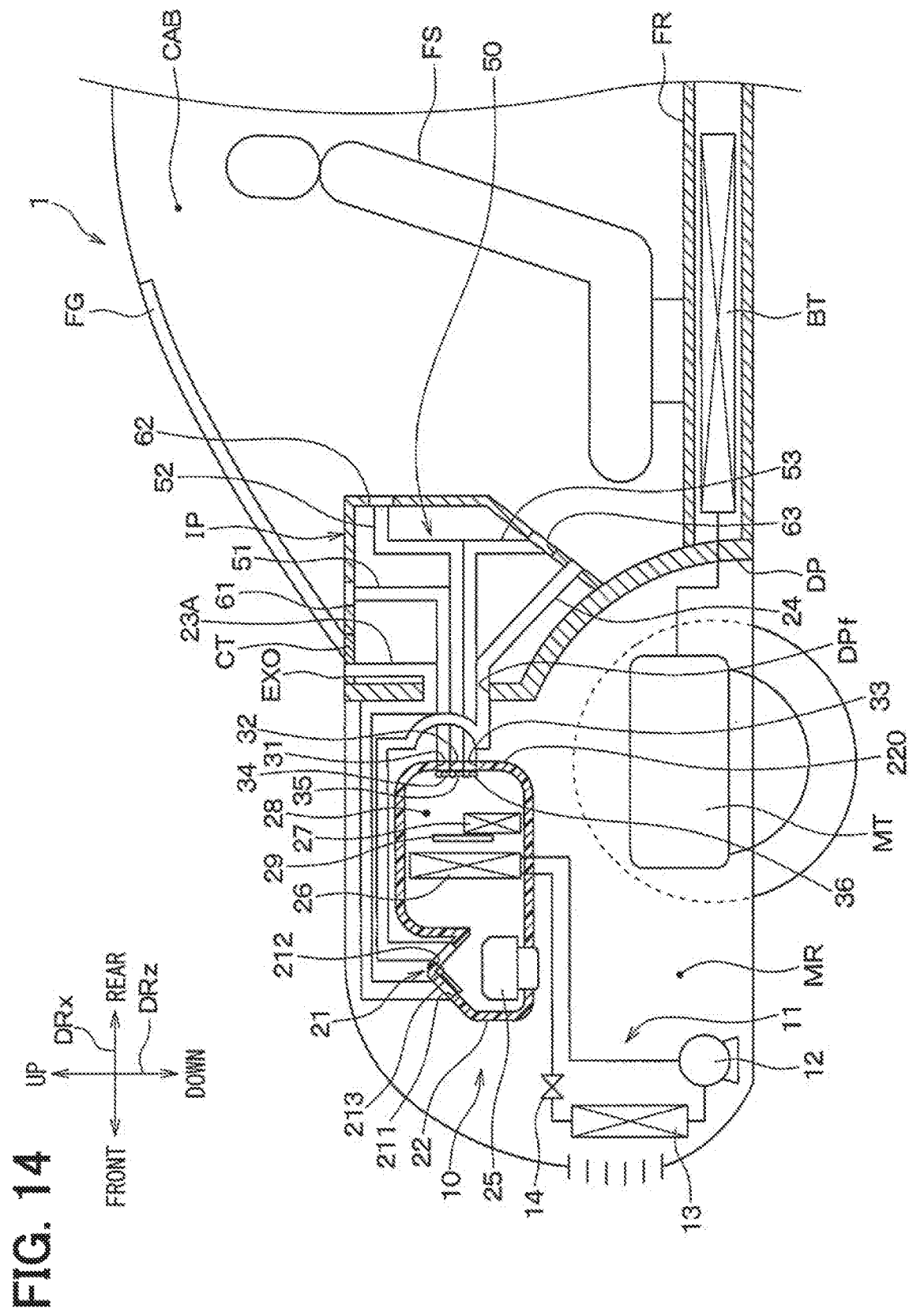
FIG. 14 is a schematic side view of a vehicle equipped with an air conditioner of a fifth embodiment.

As illustrated in FIG. 14, the outside air introduction duct 23A of the present embodiment is connected to an external opening EXO which is open on a cowl top CT disposed between a windshield FG and a dash panel DP. Thus, a part of the outside air introduction duct 23A of the present embodiment, the part being located on the upstream side of air flow, is disposed in a cabin CAB. That is, the outside air introduction duct 23A of the present embodiment is disposed over a device housing room MR and the cabin CAB.

The outside air introduction duct 23A of the present embodiment is inserted through a single air distribution insertion hole DPf which is formed on the dash panel DP together with air distribution ducts 51 to 53 of an air distribution unit 50 and the inside air introduction duct 24. In the present embodiment, both the outside air introduction duct 23A and the inside air introduction duct 24 constitute a cabin side suction duct. For convenience of description, hereinbelow, an intermediate part of the outside air introduction duct 23A, the intermediate part being inserted through the air distribution insertion hole DPf, may be referred to as the outside air intermediate part 231.

In the present embodiment, a defroster intermediate part 511, a face intermediate part 521, a foot intermediate part 531, the outside air intermediate part 231, and an inside air intermediate part 241 are configured as separate members and integrally bundled together with a binding member such as a clip (not illustrated). The defroster intermediate part 511, the face intermediate part 521, the foot intermediate part 531, the outside air intermediate part 231, and the inside air intermediate part 241 may be configured as an integrally molded product.

Figure 15:
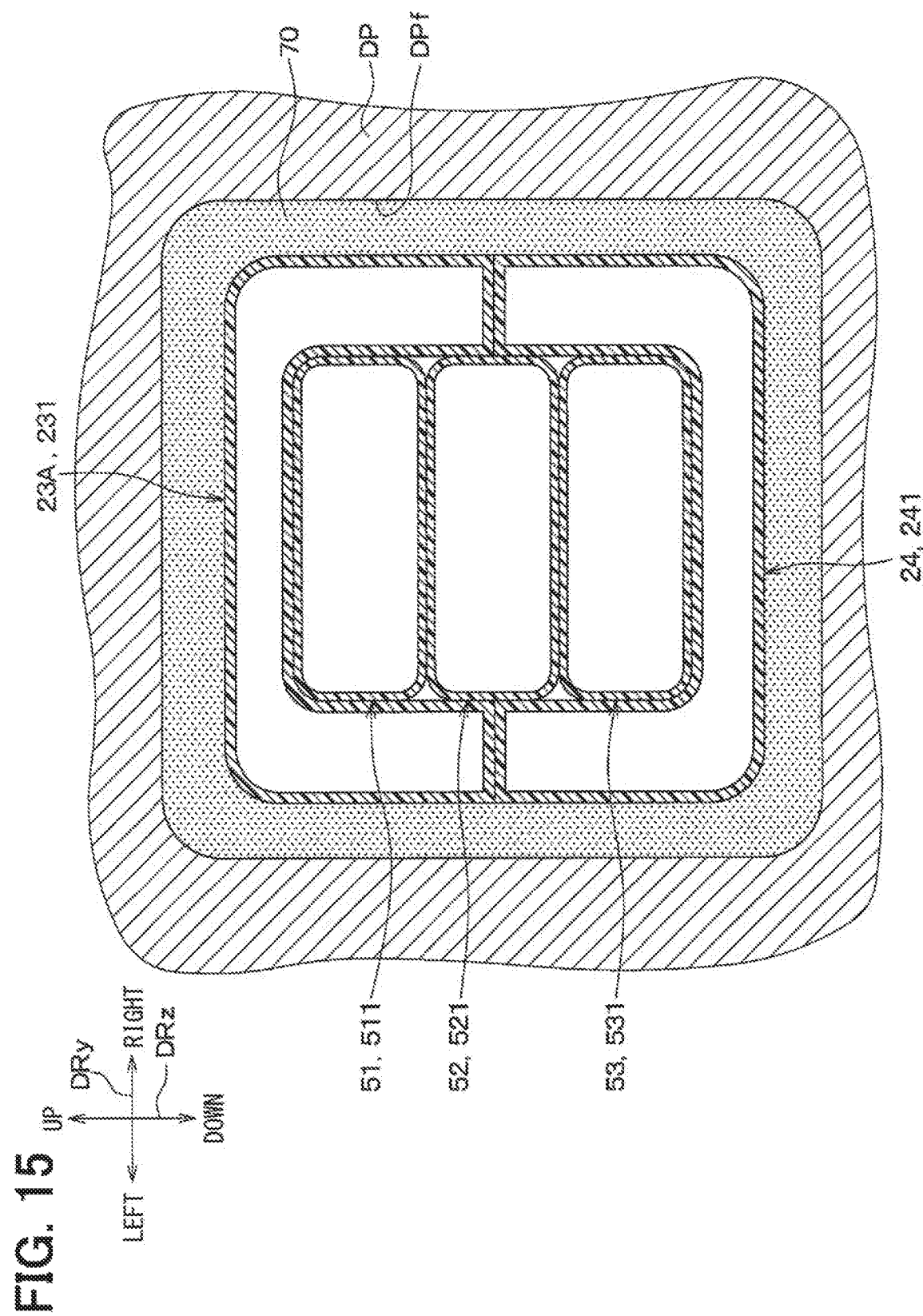
FIG. 15 is a schematic sectional view illustrating an air distribution unit of the air conditioner of the fifth embodiment.

As illustrated in FIG. 15, in the air distribution unit 50 of the present embodiment, the face intermediate part 521 is interposed between the deforester intermediate part 511 and the foot intermediate part 531. The air distribution unit 50 of the present embodiment has a disposition configuration in which the intermediate parts 511, 521, 531 of the air distribution ducts 51 to 53 are surrounded by the outside air intermediate part 231 and the inside air intermediate part 241. That is, the intermediate parts 511, 521, 531 of the air distribution ducts 51 to 53 are covered with the intermediate part 231 of the outside air introduction duct 23A and the intermediate part 241 of the inside air introduction duct 24, the outside air introduction duct 23A and the inside air introduction duct 24 constituting the cabin side suction duct, so that a part exposed to the outside is reduced. Specifically, in the air distribution unit 50 of the present embodiment, the entire outer peripheral side of the intermediate parts 511, 521, 531 of the air distribution ducts 51 to 53 is covered with the outside air intermediate part 231 and the inside air intermediate part 241.

In the air distribution unit 50 of the present embodiment, the outside air intermediate part 231 is disposed on the upper side relative to the inside air intermediate part 241 in the up-down direction DRz. The outside air intermediate part 231 may be disposed on the lower side relative to the inside air intermediate part 241 in the up-down direction DRz.

The other configuration of an air conditioner 10 of the present embodiment is similar to that of the first embodiment. The air conditioner 10 of the present embodiment can obtain effects achieved by the configuration common with the first embodiment in a manner similar to the first embodiment.

In the air conditioner 10 of the present embodiment, the outside air intermediate part 231 and the inside air intermediate part 241 are bundled together with the defroster intermediate part 511, the face intermediate part 521, and the foot intermediate part 531, and inserted through the air distribution insertion hole DPf.

Accordingly, it is possible to reduce the number of insertion holes for inserting ducts on the dash panel DP. Accordingly, noise generated in the device housing room MR is less likely to leak into the cabin CAB. Thus, it is possible to ensure the sound insulation property in the cabin CAB. Further, during manufacture, it is only required that the air distribution ducts 51 to 53, the outside air introduction duct 23A, and the inside air introduction duct 24 in a bundled state be inserted through the air distribution insertion hole DPf on the dash panel DP. Thus, it is possible to improve the workability during manufacture.

In the present embodiment, the intermediate parts 511, 521, 531 of the air distribution ducts 51 to 53 are covered with the intermediate parts 231, 241 of the outside air introduction duct 23A and the inside air introduction duct 24. Accordingly, the exposed area directly exposed to the device housing room MR is reduced in the air distribution ducts 51 to 53. As a result, air flowing through the air distribution ducts 51 to 53 is less likely to be affected by the temperature in the device housing room MR. Thus, it is possible to blow temperature-controlled air controlled to a comfortable temperature toward the occupant.

Modification of Fifth Embodiment

The above fifth embodiment describes an example in which the outside air introduction duct 23A and the inside air introduction duct 24, which constitute the cabin side suction duct, are disposed so that the intermediate parts 511, 521, 531 of the air distribution ducts 51 to 53 are not exposed to the outside. However, the present disclosure is not limited thereto.

For example, the air distribution unit 50 may have a configuration in which the intermediate parts 511, 521, 531 of the air distribution ducts 51 to 53 are disposed so that the intermediate parts 231, 241 of the outside air introduction duct 23A and the inside air introduction duct 24, which constitute the cabin side suction duct, are not exposed to the outside.

Figure 16:
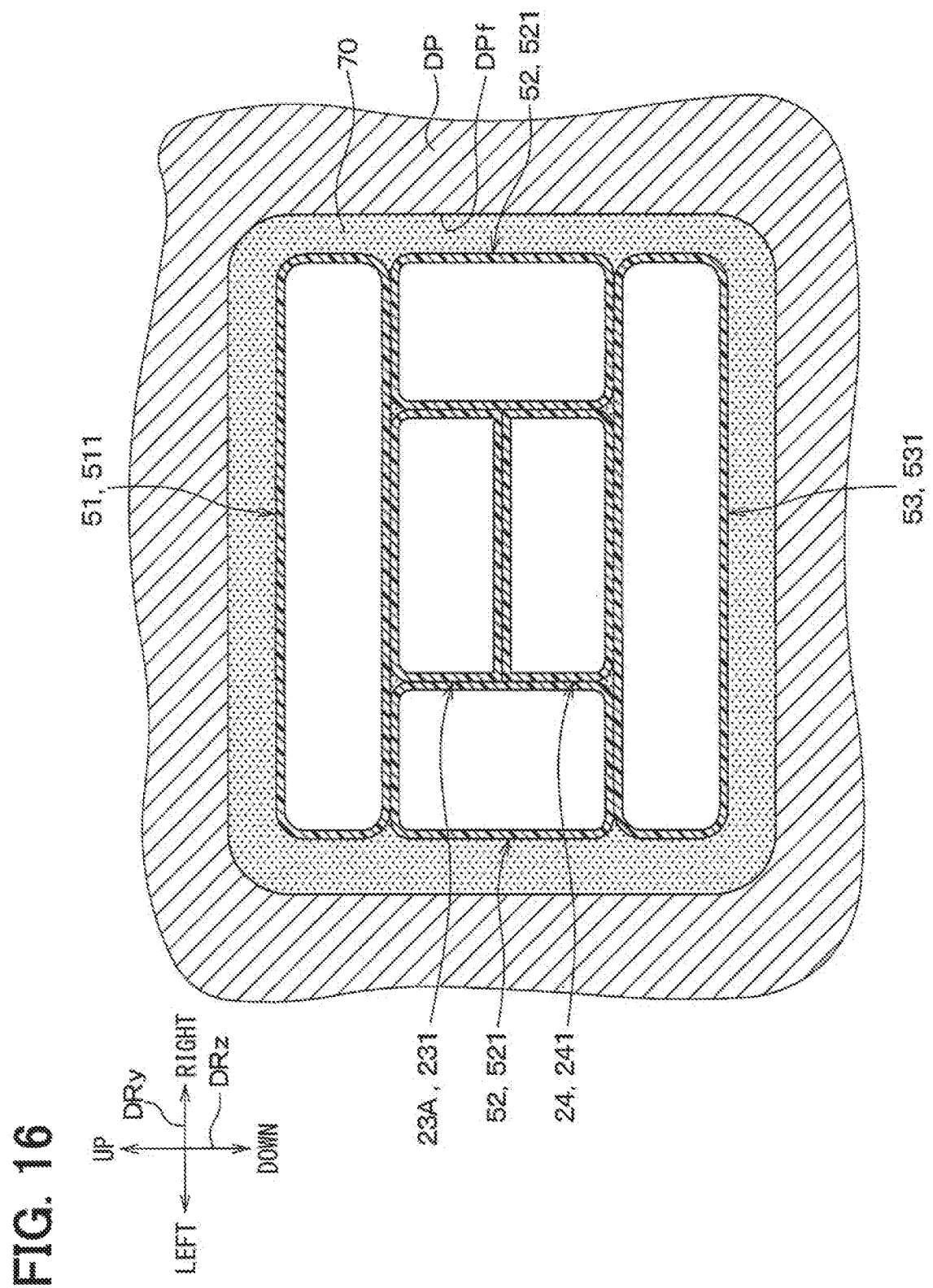
FIG. 16 is a schematic sectional view illustrating an air distribution unit as a modification of the air conditioner of the fifth embodiment.

Specifically, as illustrated in FIG. 16, in the air distribution unit 50, the outside air intermediate part 231 and the inside air intermediate part 241 are adjacent to each other. Further, the air distribution unit 50 of the present modification has a disposition configuration in which the intermediate parts 231, 241 of the outside air introduction duct 23 and the inside air introduction duct 24 are surrounded by the intermediate parts 511, 521, 531 of the air distribution ducts 51 to 53. That is, the intermediate parts 231, 241 of the outside air introduction duct 23 and the inside air introduction duct 24 are covered with the intermediate parts 511, 521, 531 of the air distribution ducts 51 to 53. Specifically, in the air distribution unit 50 of the present modification, the entire outer peripheral side of the intermediate parts 231, 241 of the outside air introduction duct 23 and the inside air introduction duct 24 is covered with the intermediate parts 511, 521, 531 of the air distribution ducts 51 to 53.

The other configuration of the air conditioner 10 of the present modification is similar to that of the fifth embodiment. The air conditioner 10 of the present modification can obtain effects achieved by the configuration common with the fifth embodiment in a manner similar to the fifth embodiment.

In the present modification, the intermediate parts 231, 241 of the outside air introduction duct 23A and the inside air introduction duct 24 are covered with the intermediate parts 511, 521, 531 of the air distribution ducts 51 to 53. Such a configuration reduces the exposed area directly exposed to the device housing room MR in the outside air introduction duct 23A and the inside air introduction duct 24. As a result, air flowing through the outside air introduction duct 23A and the inside air introduction duct 24 is less likely to be affected by the temperature in the device housing room MR.

For example, when inside air is introduced into the temperature control unit 20 during cooling in the cabin CAB, cold air in the cabin CAB can be introduced into the temperature control unit 20. Thus, it is possible to reduce a cooling load in the temperature control unit 20. Further, when inside air is introduced into the temperature control unit 20 during heating in the cabin CAB, hot air in the cabin CAB can be introduced into the temperature control unit 20. Thus, it is possible to reduce a heating load in the temperature control unit 20.

The introduction of inside air into the temperature control unit 20 during heating in the cabin CAB has an advantage that an energy loss caused by a ventilation loss and the like can be reduced. In particular, the vehicle 1 in which the traveling driving device is the electric motor MT tends to be short of an energy source for heating in the cabin CAB due to a small amount of waste heat of the driving device as compared to a vehicle in which the driving device is an engine. Thus, the configuration in which at least the intermediate part 241 of the inside air introduction duct 24 is covered with the intermediate parts 511, 521, 531 of the air distribution ducts 51 to 53 is suitable for the vehicle 1 in which the driving device is the electric motor MT.

Other Embodiment

It should be appreciated that the present disclosure is not limited to the embodiments described above and can be modified appropriately, for example, as follows.

In the above embodiment, the face intermediate part 521 is interposed between the defroster intermediate part 511 and the foot intermediate part 531, but is not limited. The arrangement of the air distribution ducts 51 to 53 may suitably be set while the intermediate parts 511, 521, 531 of the air distribution ducts 51 to 53 are bundled, in the air distribution unit 50.

In the above embodiment, the air conditioner 10 is applied to the vehicle 1 driven by the electric motor MT, but is not limited. The air conditioner 10 may be applied to a vehicle, for example, driven by an engine while there is sufficient space in the device housing room MR.

In the respective embodiments above, it goes without saying that elements forming the embodiments are not necessarily essential unless specified as being essential or deemed as being apparently essential in principle.

In a case where a reference is made to the components of the respective embodiments as to numerical values, such as the number, values, amounts, and ranges, the components are not limited to the numerical values unless specified as being essential or deemed as being apparently essential in principle.

In a case where a reference is made to the components of the respective embodiments above as to shapes and positional relations, the components are not limited to the shapes and the positional relations unless explicitly specified or limited to particular shapes and positional relations in principle.

According to the first aspect represented by a part or all of the embodiments, intermediate parts of the air distribution ducts located at least between the outer space and the cabin are bundled together and extended through a single insertion hole formed in the partition wall, in the air conditioner for a vehicle.

According to the second aspect, in the air conditioner, the intermediate part of the cold air introduction duct extended through the insertion hole is interposed between the intermediate parts of the hot air introduction ducts extended through the insertion hole.

According to the third aspect, in the air conditioner, the cold air introduction duct includes a face duct that guides the temperature-controlled air to a face blowoff part that blows the temperature-controlled air toward an upper body of an occupant. The hot air introduction ducts include a foot duct that guides the temperature-controlled air to a foot blowoff part that blows the temperature-controlled air toward a lower body of the occupant and a defroster duct that guides the temperature-controlled air to a defroster blowoff part that blows the temperature-controlled air toward a window in the cabin. The intermediate part of the face duct extended through the insertion hole is interposed between the intermediate part of the foot duct extended through the insertion hole and the intermediate part of the defroster duct extended through the insertion hole.

It is possible to reduce an exposed area of the face duct directly exposed to the outer space. Thus, it is possible to prevent a temperature rise in cold air flowing through the face duct, the temperature rise being caused by heat generated by the driving device in the outer space. As a result, it is possible to blow cold air controlled to a comfortable temperature toward the upper body of the occupant.

According to the fourth aspect, in the air conditioner, the face blowoff part is located on the upper side relative to the foot blowoff part and on the lower side relative to the defroster blowoff part. The intermediate part of the face duct extended through the insertion hole is interposed between the intermediate part of the foot duct extended through the insertion hole and the intermediate part of the defroster duct extended through the insertion hole in an up-down direction of the vehicle. The intermediate part of the defroster duct extended through the insertion hole is located on the upper side relative to the intermediate part of the foot duct extended through the insertion hole in the up-down direction of the vehicle.

The intermediate parts of the air distribution ducts are bundled together corresponding to the positions of the blowoff parts in the up-down direction. Accordingly, it is possible to simplify routing of each of the air distribution ducts in the cabin. The simplification of the routing of each of the air distribution ducts has an advantage that a sufficient space in the cabin can be more easily secured.

According to the fifth aspect, in the air conditioner, the face blowoff part includes a side blowoff part that blows the temperature-controlled air from both sides in a width direction of the vehicle and a center blowoff part that blows the temperature-controlled air from a central side relative to the side blowoff part in the width direction of the vehicle. The face duct includes a plurality of side ducts that guide the temperature-controlled air to the side blowoff part and a center duct that guides the temperature-controlled air to the center blowoff part. The intermediate part of the center duct extended through the insertion hole is interposed between the intermediate parts of the side ducts extended through the insertion hole.

It is possible to reduce an exposed area of the center duct of the face duct directly exposed to the outer space. Thus, it is possible to prevent a temperature rise in cold air flowing through the center duct, the temperature rise being caused by heat generated by the driving device in the outer space. As a result, it is possible to blow cold air controlled to a comfortable temperature toward the upper body of the occupant.

According to the sixth aspect, in the air conditioner, an outer peripheral side of the intermediate part of the center duct is covered with the intermediate parts of the side ducts, the intermediate part of the foot duct, and the intermediate part of the defroster duct.

Accordingly, the intermediate part of the center duct is not directly exposed to the outer space. In other words, the intermediate parts of the side ducts, the intermediate part of the foot duct, and the intermediate part of the defroster duct are capable of functioning as the heat insulating element that thermally protects the intermediate part of the center duct. Thus, it is possible to prevent a temperature rise in cold air flowing through the center duct, the temperature rise being caused by heat generated by the driving device in the outer space.

According to the seventh aspect, the air distribution ducts include a plurality of hot air introduction ducts that mainly guide hot air generated by the temperature control unit into the cabin and a cold air introduction duct that mainly guides cold air generated by the temperature control unit into the cabin. The hot air introduction ducts include a foot duct that guides the temperature-controlled air to a foot blowoff part that blows the temperature-controlled air toward a lower body of an occupant. The intermediate part of the foot duct extended through the insertion hole is interposed between the intermediate parts of air distribution ducts other than the foot duct extended through the insertion hole.

Since the exposed area of the foot duct directly exposed to the outer space can be reduced, it is possible to prevent a temperature lowering in hot air flowing through the foot duct, the temperature lowering being caused by cold air in the outer space. As a result, it is possible to blow hot air controlled to a comfortable temperature toward the lower body of the occupant.

According to the eighth aspect, the cold air introduction duct includes a face duct that guides the temperature-controlled air to a face blowoff part that blows the temperature-controlled air toward an upper body of the occupant. The hot air introduction ducts include a defroster duct that guides the temperature-controlled air to a defroster blowoff part that blows the temperature-controlled air toward a window in the cabin in addition to the foot duct. The intermediate part of the foot duct extended through the insertion hole is interposed between the intermediate part of the face duct extended through the insertion hole and the intermediate part of the defroster duct extended through the insertion hole. As a result, it is possible to blow hot air controlled to a comfortable temperature toward the lower body of the occupant.

According to the ninth aspect, the air conditioner includes a cabin side suction duct that guides air to the temperature control unit, at least a part of the cabin side suction duct being disposed in the cabin. An intermediate part of the cabin side suction duct located at least between the outer space and the cabin is bundled together with the intermediate parts of the air distribution ducts and extended through the insertion hole.

When the intermediate part of the cabin side suction duct is bundled together with the intermediate parts of the air distribution ducts and extended through the insertion hole, it is possible to reduce the number of insertion holes for inserting ducts on the dash panel. Accordingly, noise generated in the device housing room is less likely to leak into the cabin. Thus, it is possible to ensure the sound insulation property in the cabin. Further, during manufacture, it is only required that the air distribution ducts and the inside air introduction duct in a bundled state be inserted through the air distribution insertion hole on the dash panel. Thus, it is possible to improve the workability during manufacture.

According to the tenth aspect, the intermediate parts of the air distribution ducts are covered with the intermediate part of the cabin side suction duct so that a part exposed to the outside is reduced. Since the exposed area of the air distribution ducts directly exposed to the outer space can be reduced, it is possible to prevent a temperature change in air flowing through the air distribution ducts, the temperature change being caused by the driving device in the outer space. As a result, it is possible to blow air controlled to a comfortable temperature into the cabin.

According to the eleventh aspect, the cabin side suction duct includes at least an inside air introduction duct that guides air inside the cabin to the temperature control unit; and an intermediate part of the inside air introduction duct located at least between the outer space and the cabin is bundled together with the intermediate parts of the air distribution ducts and extended through the insertion hole.

Therefore, the exposed area directly exposed to the outer space is reduced in the inside air introduction duct. Thus, for example, when cold air in the cabin is sucked into the temperature control unit through the inside air introduction duct during cooling in the cabin, it is possible to prevent a temperature rise in cold air flowing through the inside air introduction duct, the temperature rise being caused by heat generated by the driving device in the outer space. As a result, it is possible to reduce a cooling load in the temperature control unit and improve the air conditioning efficiency.

According to the twelfth aspect, the intermediate part of the inside air introduction duct is covered with at least one of the intermediate parts of the air distribution ducts so that a part exposed to the outside is reduced. It is possible to prevent a temperature change in air flowing through the inside air introduction duct, the temperature change being caused by the driving device in the outer space. As a result, it is possible to introduce inside air with temperature suitable for the temperature control unit.

According to the thirteenth aspect, the air conditioner is applied to a vehicle in which the driving device includes an electric motor driven by power supplied from a battery mounted on the vehicle. In the vehicle (such as electric car) in which the traveling driving device is the electric motor, the outer space has more space than a vehicle in which the driving device is an engine. Thus, the air conditioner in which the temperature control unit is disposed in the outer space is suitable for the vehicle in which the driving device is the electric motor.

What is claimed is:

1. An air conditioner for a vehicle housed in an outer space separated from a cabin by a partition wall, the air conditioner comprising:
    a temperature control unit that controls a temperature of air blown into the cabin; and
    a plurality of air distribution ducts connected to the temperature control unit to guide temperature-controlled air having a temperature controlled by the temperature control unit to predetermined positions in the cabin, wherein:
    the temperature control unit is disposed in the outer space; and
    intermediate parts of the plurality of air distribution ducts located at least between the outer space and the cabin are bundled together and extended through a single insertion hole formed in the partition wall, wherein
    each of the plurality of air distribution ducts has one intermediate part.

2. The air conditioner according to claim 1, wherein:
    the plurality of air distribution ducts comprise a plurality of hot air introduction ducts that guide hot air generated by the temperature control unit into the cabin and a cold air introduction duct that guides cold air generated by the temperature control unit into the cabin; and
    the intermediate part of the cold air introduction duct extended through the insertion hole is interposed between the intermediate parts of the plurality of hot air introduction ducts extended through the insertion hole.

3. The air conditioner according to claim 2, wherein:
    the cold air introduction duct comprises a face duct that guides the temperature-controlled air to a face blowoff part that blows the temperature-controlled air toward an upper body of an occupant;
    the plurality of hot air introduction ducts comprise
        a foot duct that guides the temperature-controlled air to a foot blowoff part that blows the temperature-controlled air toward a lower body of the occupant, and
        a defroster duct that guides the temperature-controlled air to a defroster blowoff part that blows the temperature-controlled air toward a window in the cabin; and
    the intermediate part of the face duct extended through the insertion hole is interposed between the intermediate part of the foot duct extended through the insertion hole and the intermediate part of the defroster duct extended through the insertion hole.

4. The air conditioner according to claim 3, wherein:
    the face blowoff part is located on an upper side relative to the foot blowoff part and on a lower side relative to the defroster blowoff part;
    the intermediate part of the face duct extended through the insertion hole is interposed between the intermediate part of the foot duct extended through the insertion hole and the intermediate part of the defroster duct extended through the insertion hole in an up-down direction of the vehicle; and
    the intermediate part of the defroster duct extended through the insertion hole is located on the upper side relative to the intermediate part of the foot duct extended through the insertion hole in the up-down direction of the vehicle.

5. The air conditioner according to claim 3, wherein:
    the face blowoff part includes side blowoff parts that blow the temperature-controlled air from both sides in a width direction of the vehicle and a center blowoff part that blows the temperature-controlled air from a central side relative to the side blowoff parts in the width direction of the vehicle;
    the face duct includes a plurality of side ducts that guide the temperature-controlled air to the side blowoff parts and a center duct that guides the temperature-controlled air to the center blowoff part; and
    the intermediate part of the center duct extended through the insertion hole is interposed between the intermediate parts of the side ducts extended through the insertion hole.

6. The air conditioner according to claim 5, wherein an outer peripheral side of the intermediate part of the center duct is covered with the intermediate parts of the plurality of side ducts, the intermediate part of the foot duct, and the intermediate part of the defroster duct.

7. The air conditioner according to claim 1, wherein:
    the plurality of air distribution ducts include a plurality of hot air introduction ducts that guide hot air generated by the temperature control unit into the cabin and a cold air introduction duct that guides cold air generated by the temperature control unit into the cabin;
    the plurality of hot air introduction ducts include a foot duct that guides the temperature-controlled air to a foot blowoff part that blows the temperature-controlled air toward a lower body of an occupant; and
    the intermediate part of the foot duct extended through the insertion hole is interposed between the intermediate parts of the plurality of air distribution ducts other than the foot duct extended through the insertion hole.

8. The air conditioner according to claim 7, wherein:
the cold air introduction duct includes a face duct that guides the temperature-controlled air to a face blowoff part that blows the temperature-controlled air toward an upper body of the occupant;
the plurality of hot air introduction ducts include a defroster duct that guides the temperature-controlled air to a defroster blowoff part that blows the temperature-controlled air toward a window in the cabin in addition to the foot duct; and
the intermediate part of the foot duct extended through the insertion hole is interposed between the intermediate part of the face duct extended through the insertion hole and the intermediate part of the defroster duct extended through the insertion hole.

9. The air conditioner according to claim 1, further comprising:
a cabin side suction duct that guides air to the temperature control unit, at least a part of the cabin side suction duct being disposed in the cabin, wherein
an intermediate part of the cabin side suction duct located at least between the outer space and the cabin is bundled together with the intermediate parts of the plurality of air distribution ducts and extended through the insertion hole.

10. The air conditioner according to claim 9, wherein the intermediate parts of the plurality of air distribution ducts are covered with the intermediate part of the cabin side suction duct.

11. The air conditioner according to claim 9, wherein:
the cabin side suction duct includes at least an inside air introduction duct that guides air inside the cabin to the temperature control unit; and
an intermediate part of the inside air introduction duct located at least between the outer space and the cabin is bundled together with the intermediate parts of the plurality of air distribution ducts and extended through the insertion hole.

12. The air conditioner according to claim 11, wherein the intermediate part of the inside air introduction duct is covered with at least one of the intermediate parts of the plurality of air distribution ducts.

13. The air conditioner according to claim 1, wherein a driving device of a traveling power source housed in the outer space includes an electric motor driven by power supplied from a battery mounted on the vehicle.

* * * * *